United States Patent
Funawatari et al.

(10) Patent No.: US 7,333,328 B2
(45) Date of Patent: Feb. 19, 2008

(54) HARD DISK SYSTEM HAVING A HARD DISK UNIT AND A CONVERSION UNIT FOR CONNECTION TO A HOST DEVICE

(75) Inventors: Takatsugu Funawatari, Miyagi (JP); Satoshi Tanaka, Miyagi (JP); Masahiro Makino, Miyagi (JP); Takashi Nakamura, Chiba (JP); Osamu Morita, Kanagawa (JP)

(73) Assignee: Sony Corporation, Tokyo (JP)

( * ) Notice: Subject to any disclaimer, the term of this patent is extended or adjusted under 35 U.S.C. 154(b) by 501 days.

(21) Appl. No.: 10/754,108

(22) Filed: Jan. 8, 2004

(65) Prior Publication Data

US 2004/0141253 A1    Jul. 22, 2004

(30) Foreign Application Priority Data

| Jan. 8, 2003 | (JP) | ............................ P2003-002658 |
| Jan. 8, 2003 | (JP) | ............................ P2003-002659 |
| Jan. 8, 2003 | (JP) | ............................ P2003-002660 |
| Jan. 8, 2003 | (JP) | ............................ P2003-002661 |
| Jan. 8, 2003 | (JP) | ............................ P2003-002662 |
| Jan. 8, 2003 | (JP) | ............................ P2003-002663 |

(51) Int. Cl.
*G06F 1/16* (2006.01)
*H05K 5/00* (2006.01)
*H05K 7/00* (2006.01)
*G06F 13/00* (2006.01)

(52) U.S. Cl. ...................... 361/685; 361/683; 361/684; 361/686

(58) Field of Classification Search ................ 361/679, 361/683–686, 728–733
See application file for complete search history.

(56) References Cited

U.S. PATENT DOCUMENTS

| 6,301,103 | B1 * | 10/2001 | Abboud ...................... 361/683 |
| 6,320,744 | B1 * | 11/2001 | Sullivan et al. ............. 361/685 |
| 6,560,099 | B1 * | 5/2003 | Chang ......................... 361/685 |
| 6,624,979 | B1 * | 9/2003 | Wilke et al. ............. 360/256.2 |
| 6,658,202 | B1 * | 12/2003 | Battaglia et al. ............ 386/117 |
| 2002/0169911 | A1 * | 11/2002 | Shelton et al. .............. 710/300 |

* cited by examiner

*Primary Examiner*—Kim Huynh
*Assistant Examiner*—Joshua D. Schneider
(74) *Attorney, Agent, or Firm*—Sonnenschein Nath & Rosenthal LLP

(57) ABSTRACT

A large capacity HDD is handled as a portable recording medium. In a state where a portable hard disk (PHD) unit is mounted on a cradle, data is written and read between the PHD unit and a host device. By having a first engagement section on the side of the PHD unit and a second engagement section on the side of a mounting section of the cradle mutually engaged while the PHD unit is mounted on the mounting section, a state where the PHD unit is mounted on the mounting section is maintained.

31 Claims, 16 Drawing Sheets

HARD DISK SYSTEM HAVING A HARD DISK UNIT AND A CONVERSION UNIT FOR CONNECTION TO A HOST DEVICE

CROSS REFERENCE TO RELATED APPLICATIONS

The present document claims priority to Japanese Priority Document JP 2003-002658, Japanese Priority Document JP 2003-002659, Japanese Priority Document JP 2003-002660, Japanese Priority Document JP 2003-002661, Japanese Priority Document JP 2003-002662, and Japanese Priority Document JP 2003-002663, all filed in the Japanese Patent Office on Jan. 8, 2003, the entire contents of which are incorporated herein by reference to the extent permitted by law.

BACKGROUND OF THE INVENTION

1. Field of the Invention

The present invention relates to a hard disk system that uses a hard disk drive (HDD) as a portable recording medium, and to a hard disk unit and a conversion unit of such a hard disk system.

2. Description of Related Art

An HDD can store therein a large quantity of data and enables high speed access to the stored data. For this reason, in an information processing apparatus such as a personal computer and the like, the HDD plays an important role as an external storage apparatus. In recent years, taking advantage of such merits of HDDs, HDDs are beginning to be used as a bulk storage apparatus for storing image data, music data and the like even in such fields as AV devices and the like.

Conventionally, information processing apparatuses use built-in HDDs, external HDDs that are connected through a connection cable to the body of the apparatus, and the like. Recently, as more information processing apparatuses have become mobile, portable HDDs that can be carried freely have been proposed (for example, see Japanese Patent Registration No. Hei-6-66111).

In addition, among such portable HDDs, those commonly referred to as portable hard disks are already commercially available. Specifically, in such a portable hard disk, the connection between a host device and itself is made an interface that complies with the USB (Universal Serial Bus) standard. Thus, in this portable hard disk, an AC adaptor is unnecessary and power can be supplied through the power line of the USB interface. Also, this portable hard disk is designed such that data can be easily written and read simply by connecting it to the host device with a connection cable, without having to configure a driver.

SUMMARY OF THE INVENTION

The portable HDD described in Japanese Patent Registration No. Hei-6-66111 mentioned above is not necessarily easy to handle since the host device and the portable HDD must be connected to each other through a dedicated connection cable. In other words, although this portable HDD itself can be carried easily, there arises the problem of always having to carry such a dedicated connection cable around.

On the other hand, the above-mentioned portable hard disk can be connected to a host device with a general purpose connection cable. However, for example, if the interface on the HDD side complies with the IDE (Integrated Device Electronics) standard, interface conversion becomes necessary for the interface on the host device side that is compliant with the USB standard. For this reason, the above-mentioned portable hard disk has, on its circuit board, an interface conversion circuit (IDE/USB conversion circuit) for carrying out interface conversion between the interface on the HDD side (IDE) and the interface on the host device side (USB).

Thus, the above-mentioned portable hard disk must be designed so as to be bigger by a margin corresponding to the size of this circuit board, thereby causing the apparatus as a whole to become larger. In addition, although this portable hard disk itself thus has an interface that complies with the USB standard, for an electronic device having an interface that complies with some standard other than USB, it is necessary to prepare a portable hard disk having an interface conversion circuit for the interface that the electronic device has.

In addition, the power supply from the above-mentioned USB interface is about 500 mA. The portable hard disk requires more power the greater the capacity of the HDD is. Thus, there may be cases where the performance of the HDD must be dropped in accordance with the power that can be supplied. Such a drop in the performance of the portable hard disk causes not only a drop in performance on the host device side but also may cause unstable operations of the HDD and data storage may sometimes be impossible.

In addition, in the portable HDD mentioned above, when a resin housing is used for purposes of reducing weight, electromagnetic waves radiated from the HDD and the circuit board cannot be shielded, and thus there is a risk of adversely affecting the host device.

On the other hand, it is also conceivable that the HDD or the circuit board might be affected by electromagnetic waves from outside. Particularly, today, severe restrictions are imposed on electromagnetic waves from electronic devices by such standards as, for example, FCC and UCCI.

In addition, in the case of a built-in HDD, because restrictions are imposed on the electromagnetic waves radiated from the apparatus, in which the HDD is built, as a whole, the electromagnetic waves radiated from the HDD were not viewed as being much of a problem. On the contrary, in the case of portable HDDs, because the proportion of space occupied by the HDD in the housing becomes larger, and the portable HDD is used in close proximity to the host device, there is a need to shield electromagnetic waves radiated from the HDD and the circuit board inside the housing.

The present invention addresses such circumstances. Accordingly, there is provided a hard disk system, which makes it possible to carry around a large-capacity HDD freely and which is easy to use, as well as a hard disk unit and a conversion unit of such a hard disk system.

In addition, there is provided a hard disk system in which, in using a large-capacity HDD as a recording medium that can be carried around freely and that is easy to use, it is made possible to mitigate the effects of electromagnetic waves, as well as a hard disk unit and a conversion unit of such a hard disk system.

A hard disk system related to an embodiment of the present invention may include a hard disk unit and a conversion unit.

A hard disk unit related to an embodiment of the present invention may include: a recording/reading section including a hard disk, rotation means for rotating the hard disk, a magnetic head for recording and reading data to and from the hard disk rotated by the rotation means, and head actuating means for actuating the magnetic head in the radial direction of the hard disk; a first connector that is electrically connected with the recording/reading section; a first housing in) which the recording/reading section is housed and from which the first connector faces outward; and a first engaging section and a first display section provided on the first housing.

In the plane from which the first connector of the first housing faces outward, the first connector may be positioned approximately in the center, and to one side of the first connector may be provided a first positioning section and to the other side of the first connector may be provided a first fixing section.

A conversion unit related to an embodiment of the present invention may include: a second connector that can be connected with the first connector of the hard disk unit above; a transmission/reception section for transmitting/receiving data to and from a host device which performs writing and/or reading of data with respect to the hard disk unit; and interface conversion means for performing, between the second connector and the transmission/reception section, interface conversion between the interface on the side of the hard disk unit and the interface on the side of the host device.

The conversion unit may also include: a second housing that is provided with a mounting section on which the hard disk unit can be mounted; a second engagement section provided so as to be movable between a position at which it is engaged with the first engagement section and a position at which the engagement with the first engagement section is undone; and biasing means for biasing the second engagement section in a direction in which it engages with the first engagement section. The second connector may face outward from the mounting section of the second housing.

The conversion unit may also include a second display section formed on the second housing.

In the above-mentioned hard disk system, when the hard disk unit is mounted on the mounting section of the conversion unit, the first engagement section and the second engagement section are engaged and the first and second connectors are connected to each other, and data is transmitted and received between the transmission/reception section and the host device.

In addition, when the first connector and the second connector are mutually connected and the hard disk unit is in a state where it is connected to the conversion unit, data is transmitted and received between the transmission/reception section and the host device.

In addition, when the first connector and the second connector are mutually connected and the hard disk unit is in a state where it is connected to the conversion unit, the first display section and the second display section may form a continuous display section that bridges the first housing and the second housing.

In addition, the hard disk unit may also include an electromagnetic shielding plate for shielding the recording/reading section housed in the first housing.

A conversion unit related to an embodiment of the present invention may include: a second connector that can be connected to the first connector of the hard disk unit; a transmission/reception section for transmitting/receiving data to and from the host device that performs writing and/or reading of data with respect to the hard disk unit; interface conversion means for performing, between the second connector and the transmission/reception section, interface conversion between an interface on the side of the hard disk unit and an interface on the side of the host device; a circuit board on which the interface conversion means is provided; a second housing in which the circuit board is housed and from which the second connector faces outward; and an electromagnetic shielding plate that shields the circuit board housed in the second housing.

In this hard disk system, when the first connector and the second connector are mutually connected and the hard disk unit is connected to the conversion unit, data is transmitted and received between the transmission/reception section and the host device.

In addition, in this hard disk system, either the first connector or the second connector is loosely supported with some allowance for movement in a plane of the first housing or the second housing, respectively, facing outward.

A conversion unit related to an embodiment of the present invention may include: a second connector that can connect with the first connector of the hard disk unit; a transmission/reception section for transmitting and receiving data to and from the host device that performs writing and/or reading of data with respect to the hard disk unit; interface conversion means for performing, between the second connector and the transmission/reception section, interface conversion between an interface on the side of the hard disk unit and an interface on the side of the host device; and a second housing from which the second connector faces outward, wherein in the plane of the second housing from which the second connector faces outward, the second connector is positioned approximately in the center, and to one wide of the second connector is provided a second positioning section and to the other side is provided a second fixing section.

In addition, in this hard disk system, at least one of the hard disk unit and the conversion unit includes a protruding section on the above-mentioned other side of the plane of the first or second housing from which the first or second connector, respectively, faces outward.

Thus, in the present invention, it is possible to replace hard disk units with respect to the conversion unit with ease, and to minaturize and carry this hard disk unit around freely as a portable recording medium. In addition, by having the conversion unit, which is attachable to and detachable from the hard disk unit, perform interface conversion between the interface on the side of the hard disk unit and the interface on the side of the host device, it is possible to make the hard disk unit smaller in size. In addition, by having the first engagement section and the second engagement section become mutually engaged, it is possible to maintain a state in which the hard disk unit is mounted on the mounting section of the conversion unit in a suitable manner.

In addition, in the present invention, by having the first and second display sections form a continuous display section bridging the first and second housings when the first connector and the second connector are mutually connected and the hard disk unit is connected to the conversion unit, it is possible to achieve a display that is superior in terms of design.

In addition, by having the electromagnetic shielding plate shield electromagnetic waves radiated from the recording/reading section of the hard disk unit and the circuit board of the conversion unit, it is possible to prevent adverse effects on the host device that may be caused by electromagnetic waves.

In addition, in the present invention, since one of the first connector and the second connector is loosely supported with some allowance for movement in the plane of the first or second housing, respectively, facing outward, the first connector and the second connector can be connected without having to position them precisely.

In addition, in the present invention, by having the protruding section provided on one side of the plane from which the connector of one of the housings faces outward, and by having this protruding section contact the corresponding side of the plane of the other housing from which its connector faces outward, the former housing is tilted with respect to the other housing in a direction in which the first positioning section and the second positioning section are brought in close proximity to each other, and in which the first fixing section and the second fixing section, which are provided on the same plane of the respective housings as the protruding section but on the opposite side with the connector in between, are spaced further apart. Thus, a state where the first connector and the second connector are connected, the first housing and the second housing are positioned by the first positioning section and the second positioning section, and the first housing and the second housing are fixed by the first fixing section and the second fixing section can be maintained in an appropriate manner. Thus, the hard disk unit can be prevented from becoming dislocated from the mounting section while the hard disk unit is operating.

DESCRIPTION OF THE PREFERRED EMBODIMENTS

A hard disk system, a hard disk unit and a conversion unit to which the present invention is applied will be described below with reference to the attached drawings.

Figure 1:
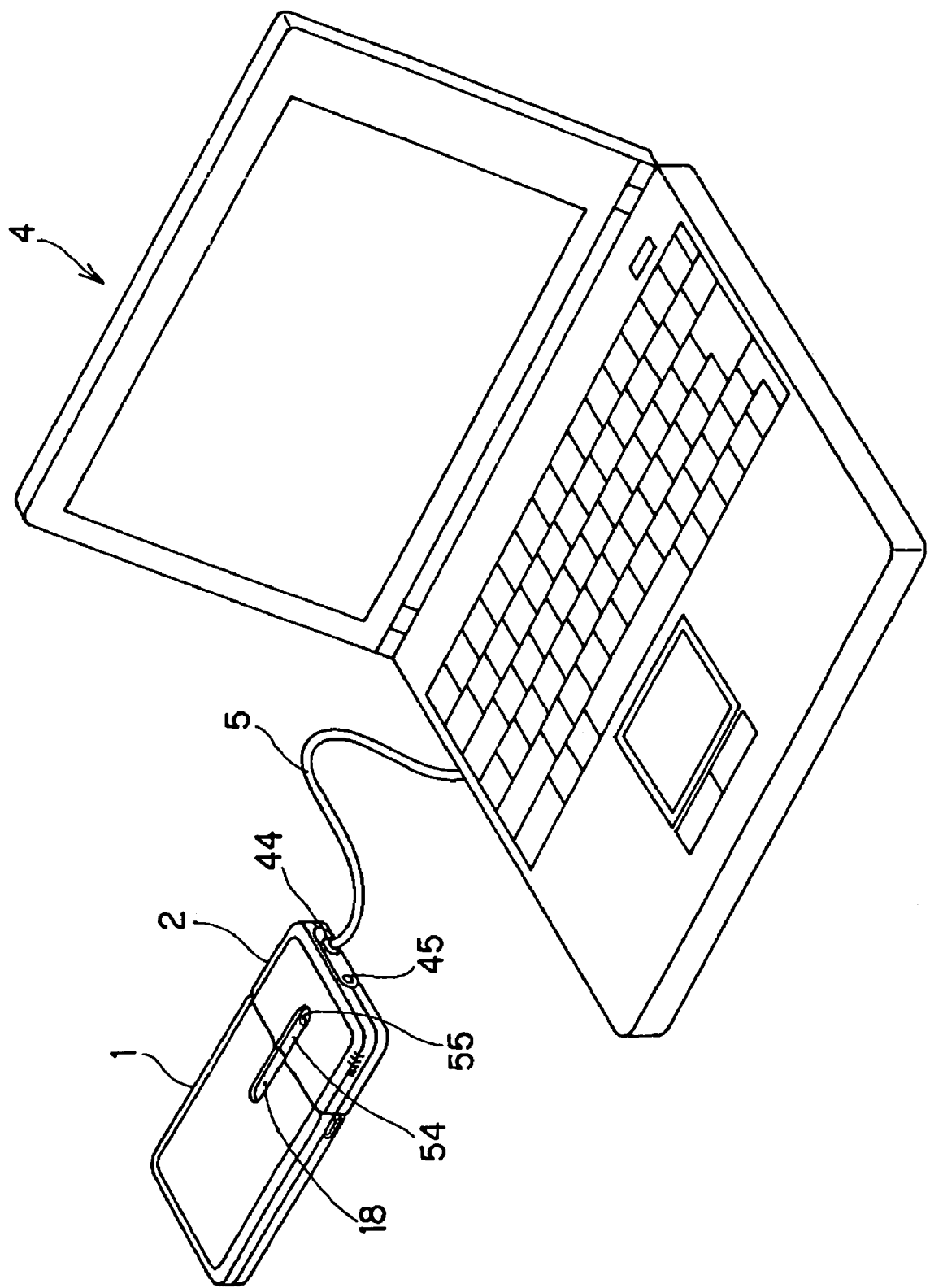
FIG. 1 is a perspective view showing a PHD (Portable Hard Disk) unit and an adaptor in use and constituting a PHD system to which the present invention is applied.
Figure 2:
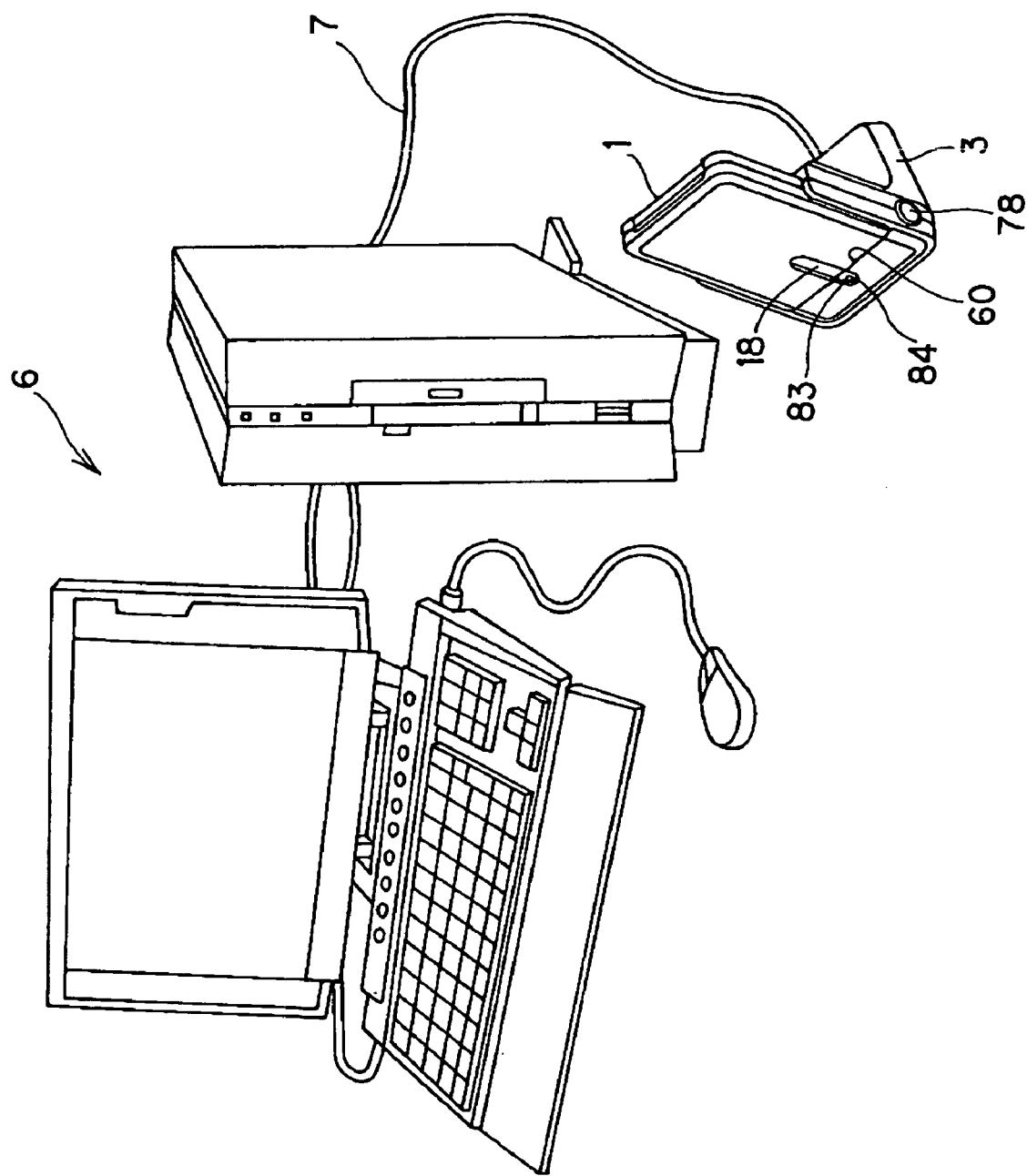
FIG. 2 is a perspective view showing a PHD unit and a cradle in use and constituting a PHD system to which the present invention is applied.

A hard disk system to which the present invention is applied is a portable hard disk system (hereafter referred to as a PHD system) that is provided with, as shown in FIGS. 1 and 2: a portable hard disk unit (hereafter referred to as a PHD unit) 1: and an adaptor 2 or a cradle 3 serving as a conversion unit.

More specifically, in the PHD system shown in FIG. 1, the PHD unit 1 is electrically connected to, for example, a notebook personal computer 4 serving as a host device via a connection cable 5 in a state where the adaptor 2 is attached to the PHD unit 1. Thus, data is written and read between the PHD unit 1 and the host device 4.

On the other hand, in the PHD system shown in FIG. 2, the PHD unit 1 is electrically connected to, for example, a desktop personal computer 6 serving as a host device through a connection cable 7 in a state where the PHD unit 1 is mounted on the cradle 3. Thus, data is written and read between the PHD unit 1 and the host device 6.

The PHD system shown in FIG. 1 is an embodiment that is suitable for handling data with a portable host device that can be used outdoors. The PHD system shown in FIG. 2 is an embodiment that is suitable for handling data with a desktop host device that is used mostly indoors. Thus, in the above-mentioned PHD system, it is possible to easily alter the combination of the PHD unit 1 and the adaptor 2 or the cradle 3, depending on how the system is used.

First, the PHD unit 1 of the PHD system shown in FIGS. 1 and 2 will be described below.

Figure 3:
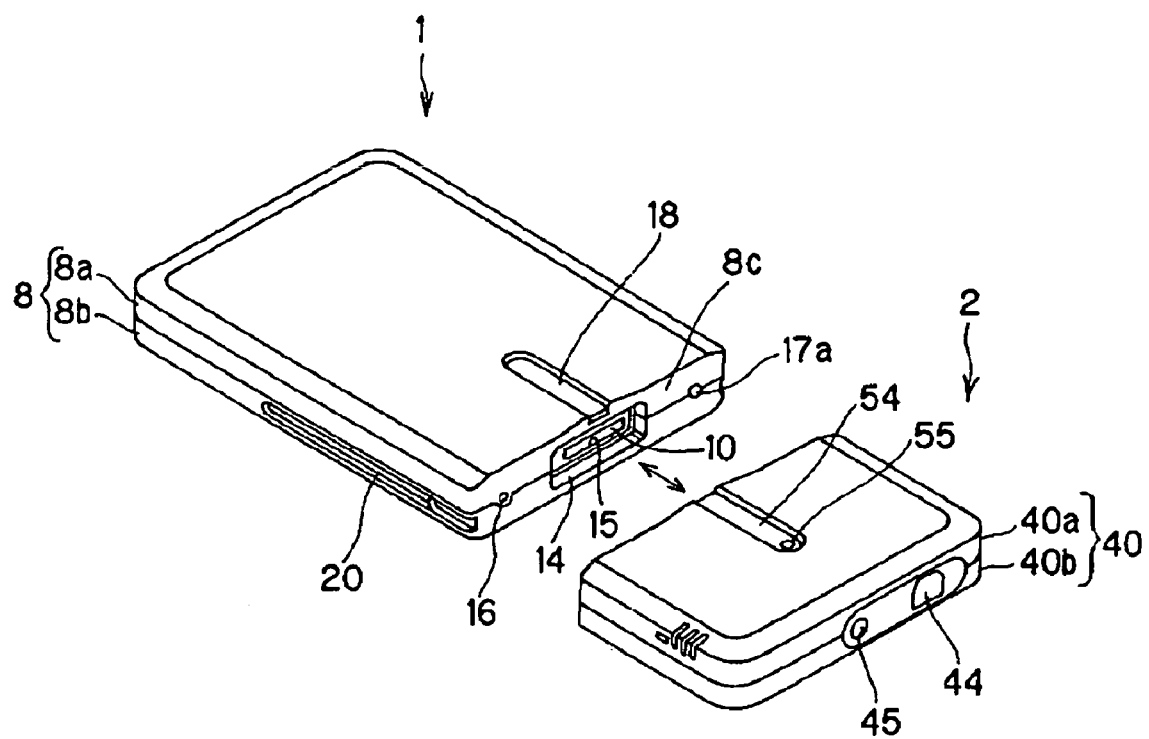
FIG. 3 is a perspective view showing the configuration of a PHD unit and an adaptor.
Figure 4:
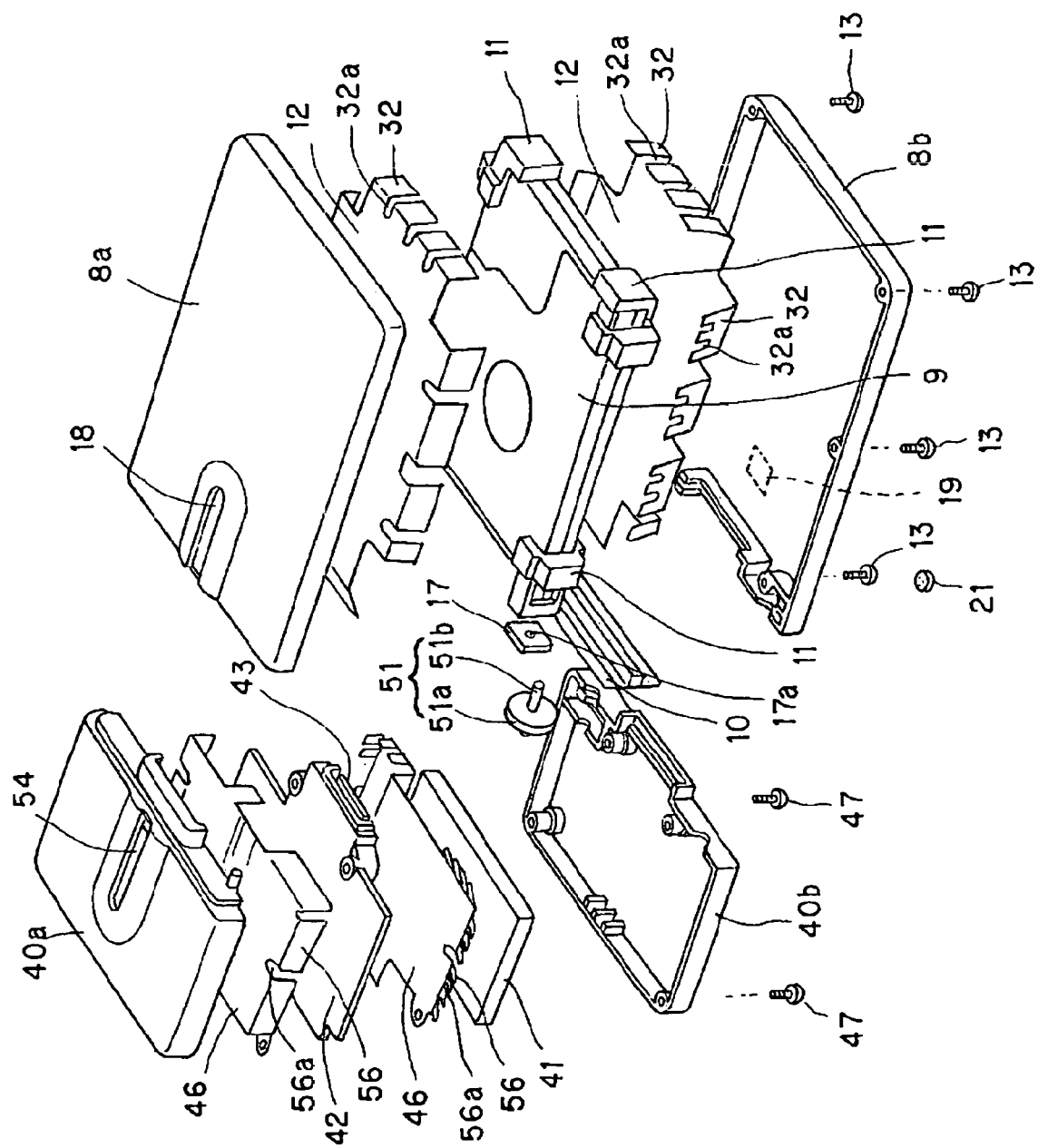
FIG. 4 is an exploded perspective view showing the configuration of a PHD unit and an adaptor.

As shown in FIGS. 3, 4 and 5, the PHD unit 1 is provided with: a first housing 8; a hard disk drive (hereafter referred to as HDD) 9 serving as a recording/reading section accommodated in this first housing 8; a first connector 10 that is electrically connected to this HDD 9 and faces outward from the first housing 8; a plurality of cushioning members 11 placed between the first housing 8 and the HDD 9; and a pair of upper and lower electro-magnetic shielding plates 12 for shielding the HDD 9.

The first housing 8 is a plastic case formed of a resin material through injection molding, and it has a structure in which an upper half 8a and a lower half 8b, each having the shape of an approximately flat box, are joined and integrated with a plurality of screws 13 into a single unit in a condition where the upper and lower halves 8a and 8b are made to face each other at their respective side walls. A space in which the HDD 9 is to be accommodated is formed inside this first housing 8, and the shape thereof resembles an approximately rectangular plate corresponding to the HDD 9.

Also, one of the shorter sides of the first housing 8 forms a connection plane 8c to be connected to the adaptor 2 and the cradle 3, which will be described later. An engagement recess 14 with which engagement protrusions of the adaptor 2 and the cradle 3 described later are engaged is formed in approximately the center of this connection plane 8c. Also, an opening 15 through which the first connector 10 is exposed is formed on the bottom surface of this engagement recess 14.

On this connection plane 8c, a positioning hole 16 serving as a first positioning section is formed on one side, and a fixing plate 17 serving as a first fixing section is provided on the other side with the first connector 10 between the positioning hole 16 and the fixing plate 17. The positioning hole 16 is formed so as to lead to an internal space in one corner separated from the space in the first housing 8 in which the HDD 9 is accommodated. The fixing plate 17 is positioned and fixed in an internal space in another corner separated from the space in the first housing 8 in which the HDD 9 is accommodated. Then, a screw hole 17a is formed in this fixing plate 17 in alignment with a hole formed in the first housing 8.

In addition, a first display section 18 for classifying and displaying the storage capacity of the HDD 9 by text or color is formed on the principal surface of the upper half 8a. This first display section 18 is devised so as to conceal gate marks generated when the first housing 8 is injection molded. In other words, on the upper half 8a of the first housing 8, a gate mark is generated approximately in a center portion towards the connection plane 8c. However, by forming the first display section 18 at such a position that this gate mark would be covered, the design is improved. In addition, this first display section 18 is formed in a substantially linear manner from where this gate mark is formed towards the end on the side of the connection plane 8c.

On the other hand, an engagement recess section 19 for maintaining a state where the PHD unit 1 is mounted on a mounting section 60 of the cradle 3, which will be described later, is formed on the principal surface of the lower half 8b. This engagement recess section 19 is formed in the shape of an approximate rectangle of a predetermined depth and at a position on the lower half 8b facing an engagement protrusion 73b of the cradle 3.

In addition, a pair of guide grooves 20 (first guiding sections), which guides the PHD unit 1 in mounting it on the mounting section 60 of the cradle 3, is formed on the elongate sides of the lower half 8b. Each guide groove 20 of the pair is formed from the end section on the side of the connection plane 8c of the lower half 8b up to some point towards the other end. Moreover, a plurality of rubber pads 21 serving as slip stoppers are provided on the principal surface of the lower half 8b in its corner sections.

Figure 5A:
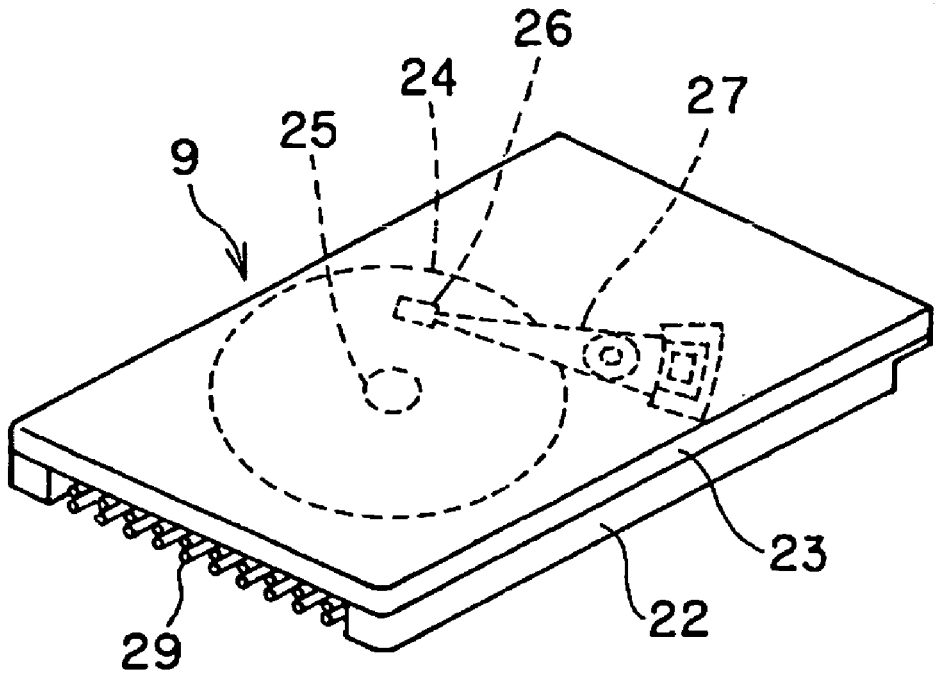
FIG. 5A and FIG. 5B are perspective views showing the configuration of a hard disk drive.
Figure 5B:
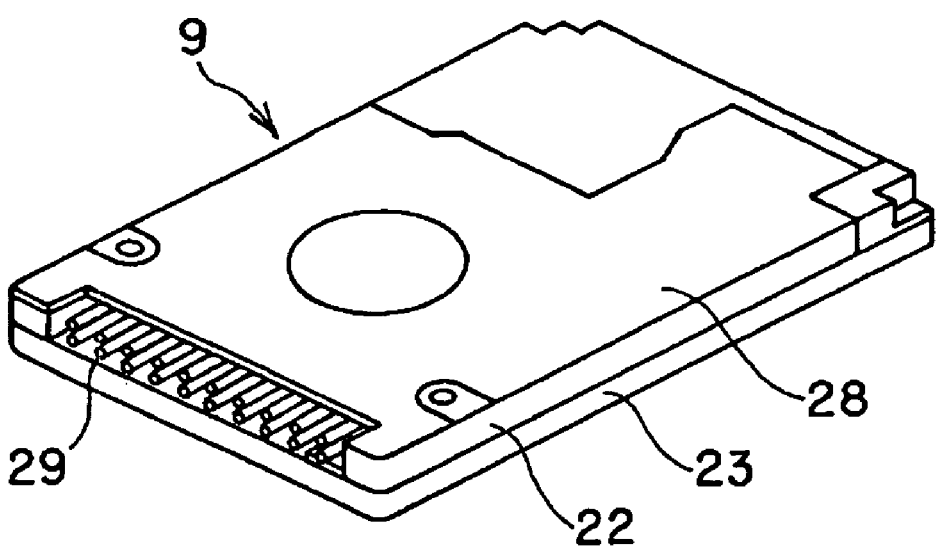

As shown in FIGS. 5A and 5B, within a space formed by a chassis 22 and a top cover 23, the HDD 9 has: a hard disk 24 that is a magnetic disk; a spindle motor 25 serving as rotating means for rotating this hard disk 24; a magnetic head 26 for recording and reading data on and from the hard disk 24; and a head actuator 27 serving as head actuating means for actuating the magnetic head 26 in the radial direction of the hard disk 24 by supporting the magnetic head 26 at its tip and being moved with its base end as a fulcrum. Also, on the back side of the chassis 22 of the HDD 9 is attached a circuit board 28 including a control circuit for controlling the above-mentioned mechanisms and for controlling the recording and reading by the magnetic head 26 with respect to the hard disk 24. In addition, connector pins 29 serving as an interface of the HDD 9, which for example complies with the IDE standard, are attached to this circuit board 28 in such a way that they face outward from one of the shorter sides of the chassis 22.

Figure 6:
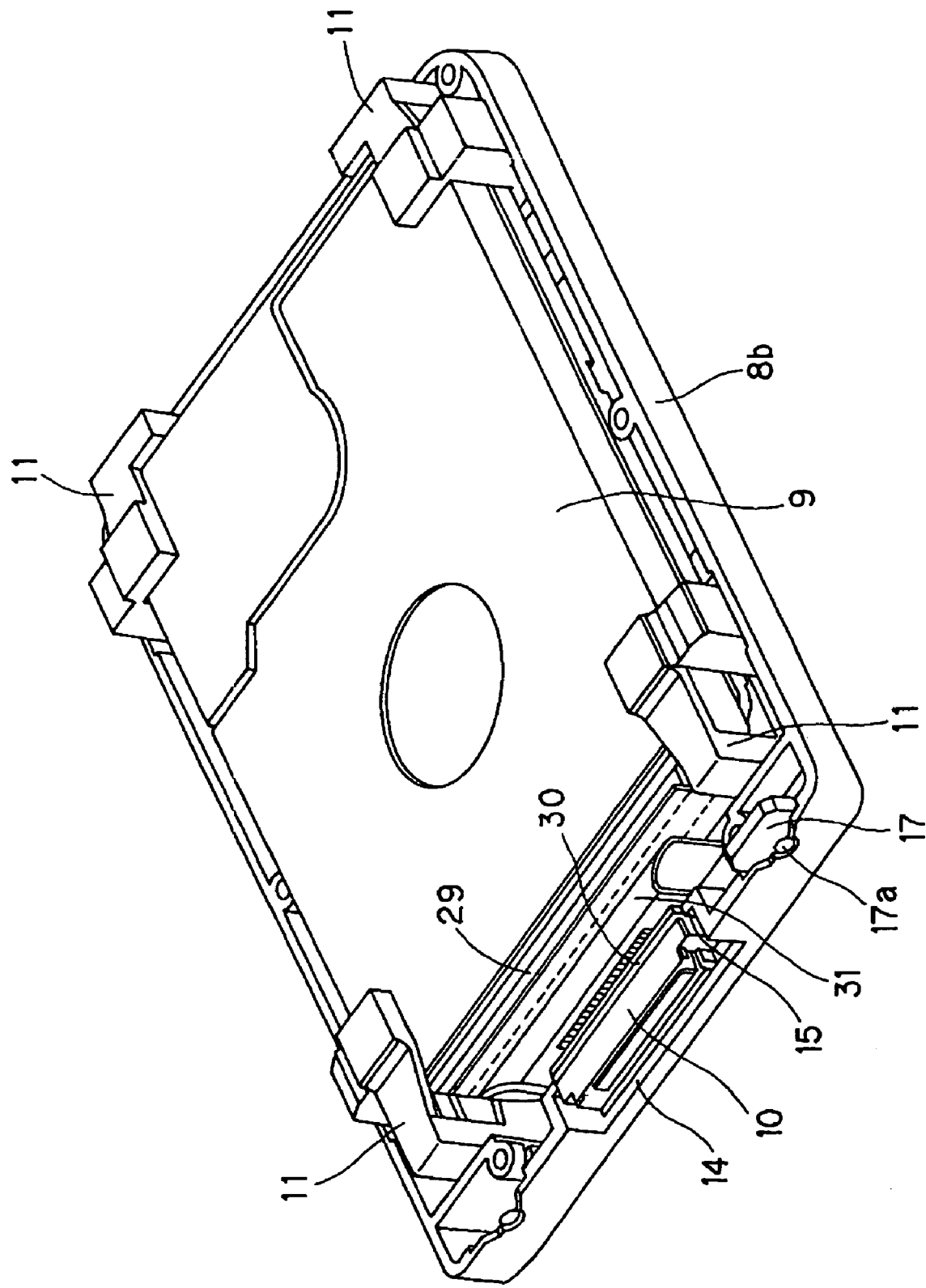
FIG. 6 is a perspective view showing how a hard disk drive is housed in a first housing.
Figure 7:
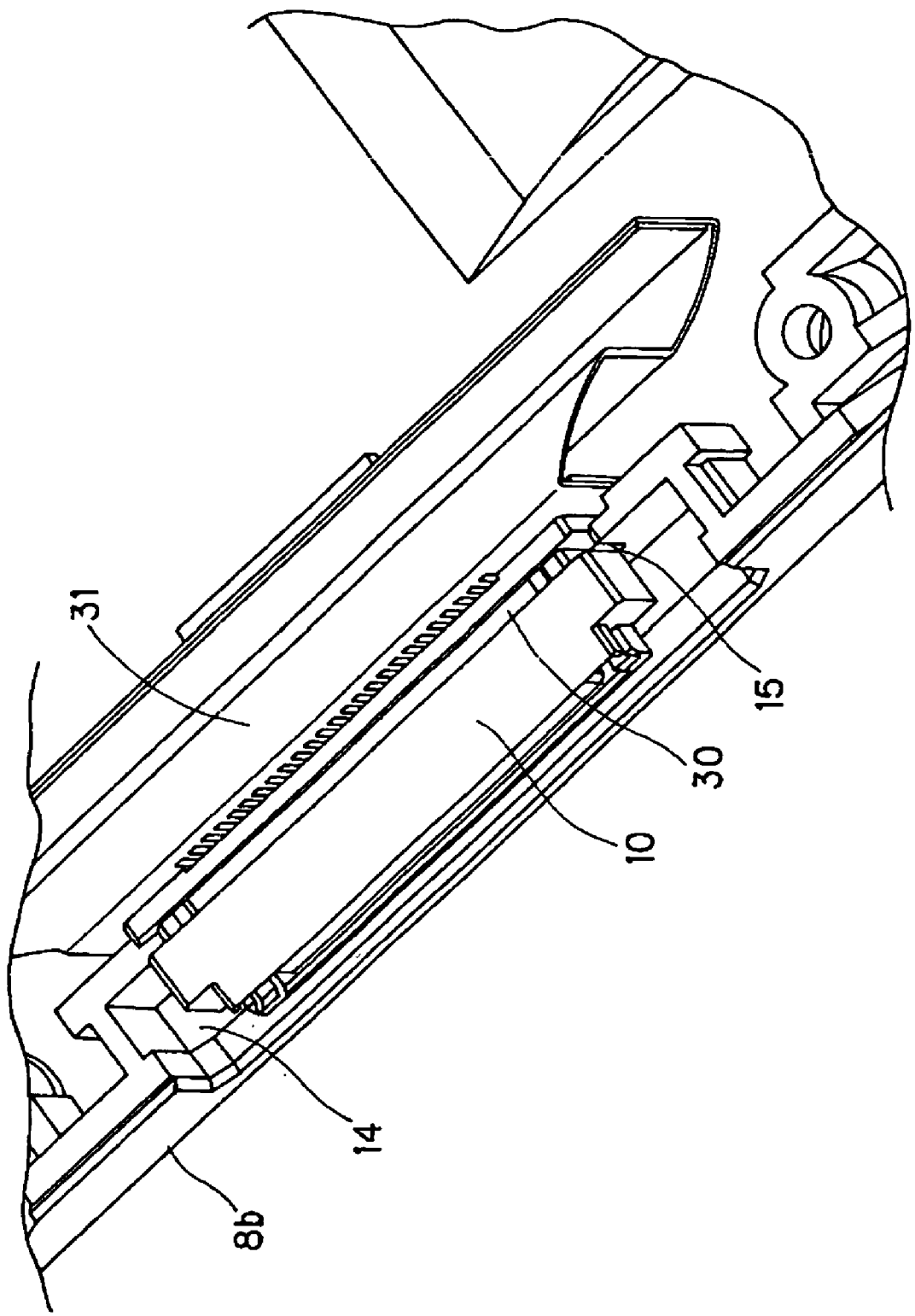
FIG. 7 is a perspective view of a main portion showing how a first connector is attached to a first housing.

As shown in FIGS. 6 and 7, the first connector 10 is a male connector, which matches the signal pin arrangement of the above-mentioned interface of the HDD 9 that complies with the above-mentioned IDE standard but is made smaller. This first connector 10 is attached within the plane of the opening 15 of the above-mentioned first housing 8 with some allowance for movement, in other words, in a semi-fixed state. Specifically, this first connector 10 has an engagement groove 30 with which portions constituting the opening 15 of the above-mentioned upper half 8a and lower half 8b are engaged, and this engagement groove 30 is formed over the perimeter of the first connector 10. By having the portions of the upper and lower halves 8a and 8b that constitute the opening 15 be engaged with the engagement groove 30, this first connector 10 is held in a state where it is semi-engaged with the opening 15 of the first housing 8 in which the upper half 8a and the lower half 8b face each other. Thus, this first connector 10 can be moved slightly within the plane of the opening 15 of the first housing 8.

This first connector 10 is electrically connected to the connector pins 29 of the HDD 9 through a flexible cable 31. This flexible cable 31 is shaped such that it tapers as it approaches the first connector 10 from the connector pins 29, and it is placed so as to be in the shape of an approximate inverted U between the connector pins 29 and the first connector 10. Thus, the first connector 10 is biased outward from the first housing 8 by the elastic force of this flexible cable 31. Consequently, it is possible to suppress unsteadiness in connecting the first connector 10 to second connectors 43 and 64 of the adaptor 2 and the cradle 3, which will be described later, thereby improving the reliability of the connection between the first connector 10 and the second connectors 43 and 64.

The cushioning members 11 are so placed as to be engaged with the four corners of the HDD 9. Thus, when this HDD 9 is accommodated in the first housing 8, they can absorb shock, vibration and the like from outside, thereby preventing the occurrence of damage and the like to the HDD 9, while also enabling stable recording and reading of data. For the cushioning members 11, it is possible to use a visco-elastic material such as rubber, a gel substance and the like having elasticity, and in some cases a metal spring such as a coil spring, a plate spring and the like may also be used.

The pair of upper and lower electro-magnetic shielding plates 12 is made of approximately rectangular metal plates that match the shape of the HDD 9. They shield both principal surfaces of the HDD 9, while also shielding the sides of this HDD 9 with a plurality of bent pieces 32 bent along the sides of the HDD 9 except for the side of the HDD 9 from which the above-mentioned connector pins 29 are exposed, wherein the bent pieces 32 of the upper and lower electro-magnetic shielding plates overlap each other. Consequently, electro-magnetic waves radiated from the HDD 9 can be shielded appropriately inside the first housing 8. Also, in the pair of upper and lower electro-magnetic shielding plates 12, a plurality of slits 32a is formed in the bent pieces 32. Thus, the connective condition of the bent pieces 32 with one another can be improved, and the shielding effect with respect to electro-magnetic waves can be improved.

The first housing 8 can be made lighter by using a plastic case formed by injection molding a resin material. Moreover, a conductive layer composed of a conductive film or the like may be formed on at least one of the principal surface of each of the upper half 8a and the lower half 8b facing the electro-magnetic shielding plates 12 and the principal surface on the side opposite that principal surface. This makes it possible to further improve the shielding effect for electro-magnetic waves. Alternatively, the first housing 8 may be formed by injection molding a resin material in which a conductive filler is contained. In this case, it is possible to improve the shielding effect for the electro-magnetic waves without having to provide an additional component.

The electrical configuration of the PHD unit 1 will be described below.

Figure 8:
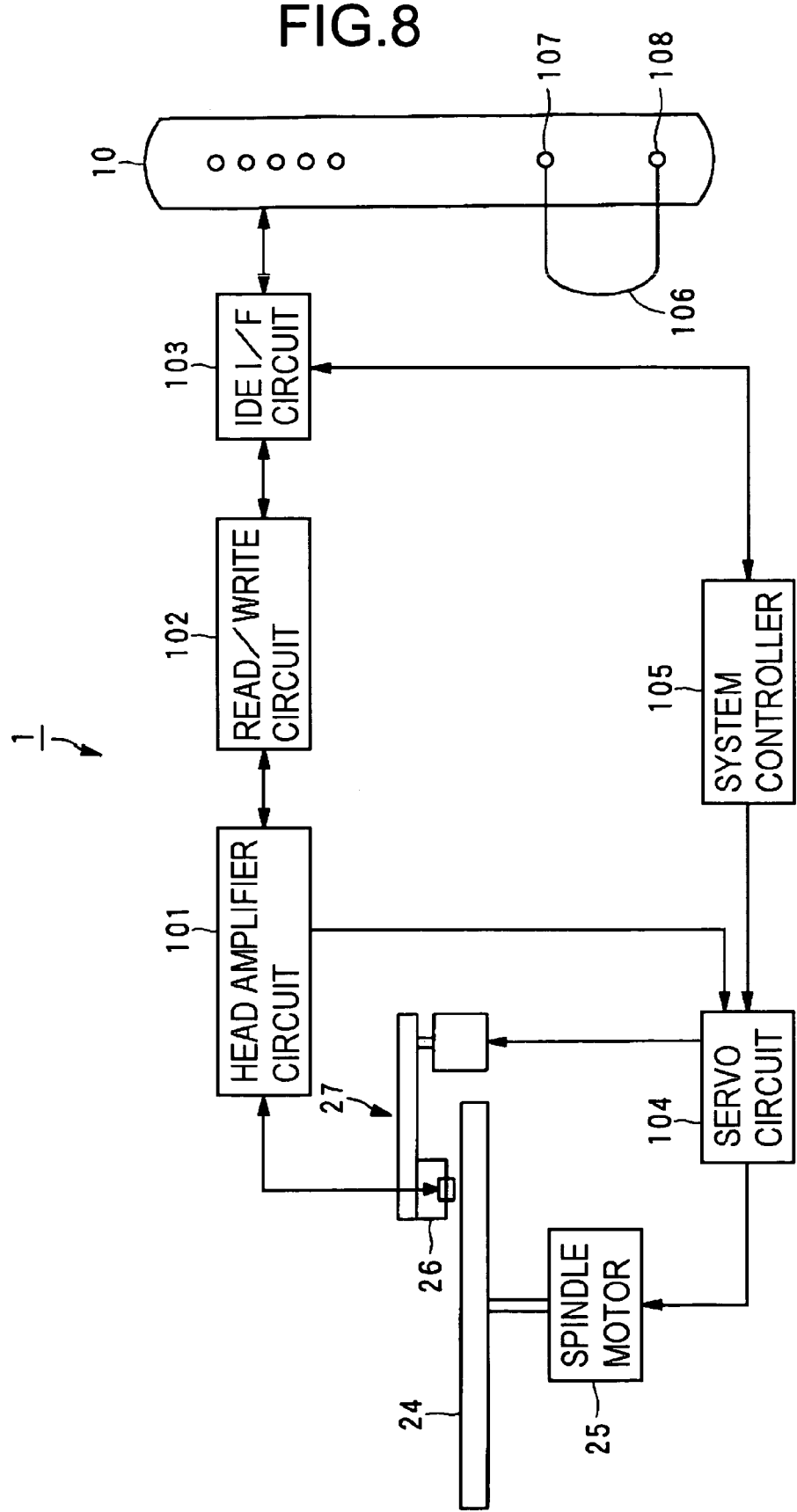
FIG. 8 is an electrical inner configuration view of a PHD unit.

As shown in FIG. 8, the PHD unit 1 is provided with: the hard disk 24 on which data is magnetically recorded as mentioned above; the spindle motor 25 for rotationally driving this hard disk 24; the magnetic head 26 for writing and reading data on and from the hard disk 24; and the head actuator 27, to which the magnetic head 26 is attached at its tip end, that turns with its base end as a fulcrum.

The spindle motor 25 rotates the hard disk 24. The magnetic head 26 is moved in the radial direction on the circular principal surface of the hard disk 24 by the head actuator 27, thereby carrying out magnetic recording and magnetic reading of data on and from a desired position on the rotating hard disk 24.

In addition, the PHD unit 1 includes: a head amplifier circuit 101 for driving the magnetic head 26 and detecting signals; a read/write circuit 102 for carrying out record data processing and read data processing; an IDE interface (I/F) circuit 103 for transmitting and receiving IDE format data; a servo circuit 104 for carrying out servo control processing; and a system controller 105.

At the time of recording, the head amplifier circuit 101 amplifies record data received from the read/write circuit 102 to generate write signals, and drives the magnetic head 26 based on these write signals. At the time of recording, the magnetic head 26 is driven by the write signal, thereby generating a magnetic field corresponding to the write signal and records data on the hard disk 24. In addition, at the time of reading, the magnetic head 26 detects the magnetic field recorded on the hard disk 24, and generates a read signal corresponding to that magnetic field. At the time of reading, the head amplifier circuit 101 receives the read signal generated by the magnetic head 26, performs an amplifying process, a binarizing process and the like on the read signal, and generates read data, and then supplies the read data to the read/write circuit 102.

At the time of recording, the read/write circuit 102 performs various record data processing with respect to the record data inputted from the IDE interface circuit 103, such as a process of adding an error correction code, modulation processing and the like, and supplies the record data to the head amplifier circuit 101. At the time of reading, the read/write circuit 102 performs various read data processing with respect to the read data inputted from the head amplifier circuit 101, such as demodulation processing, an error correcting process and the like, and supplies to the IDE interface circuit 103 the read data on which the above-mentioned read data processing has been performed.

At the time of recording, the IDE interface circuit 103 receives IDE data from the adaptor 2 or the cradle 3 via the first connector 10, converts the received IDE data into record data, and supplies it to the read/write circuit 102. At the time of reading, the IDE interface circuit 103 receives read data from the read/write circuit 102, converts this read data into IDE data, and outputs it to the adaptor 2 or the cradle 3 via the first connector 10. Also, the IDE interface circuit 103 supplies control information transferred from the adaptor 2 or the cradle 3 in the IDE format to the system controller 105, and transfers control information supplied from the system controller 105 to the adaptor 2 or the cradle 3 in the IDE format.

The servo circuit 104 carries out rotational drive control for the spindle motor 25 and actuation control for the head actuator 27 based on an error signal detected by the head amplifier circuit 101 and the like and on position control information given by the system controller 105 and the like, and records and reads data on and from a predetermined position on the hard disk 24.

The system controller 105 controls the servo circuit 104 and the like based on read data and record data of the read/write circuit 102 and the various control information from the host devices 4 and 6 supplied via the IDE interface circuit 103.

In addition, a jumper cable 106 is provided in the PHD unit 1. First and second USB power source pins 107 and 108, which are not required of an IDE interface bus, together with a transmission line which is required of an IDE interface bus, are provided in the first connector 10. The jumper cable 106 is a connection line for electrically short-circuiting the first USB power source pin 107 and the second USB power source pin 108. When the adaptor 2 or the cradle 3 is connected, the jumper cable 106 functions as a power switch. Its function will be described later in detail.

In the PHD unit 1 having the above-mentioned configuration, the record data transferred from the host devices 4 and 6 can be written on the hard disk 24, and data thus written can be stored. Also, in the PHD unit 1, the data stored in the hard disk 24 can be read out and transferred to the host devices 4 and 6. Thus, the PHD unit 1 functions as an external storage apparatus for the host devices 4 and 6.

The adaptor 2, which, together with the PHD unit 1 mentioned above, forms part of the PHD system shown in FIG. 1, will be described below.

Figure 9:
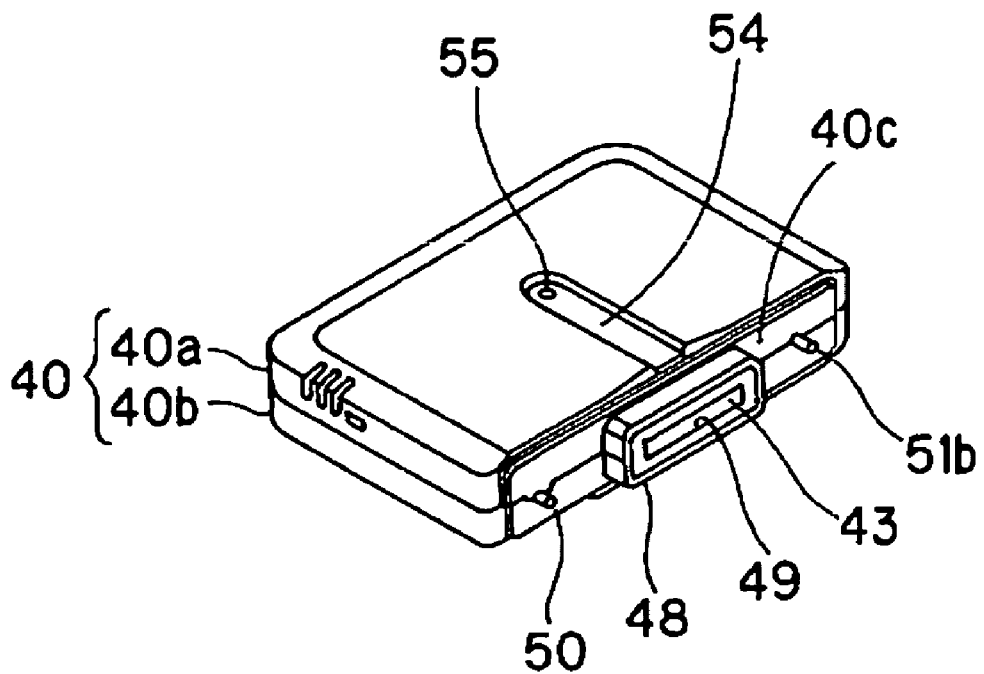
FIG. 9 is a perspective view showing the configuration of an adaptor.

As shown in FIGS. 3, 4 and 9, the adaptor 2 has: a second housing 40; a battery 41 and a circuit board 42 which are accommodated in the second housing 40; a second connector 43, a USB connector 44 and a power jack 45 which are mounted on the circuit board 42 and face outward from the second housing 40; and a pair of upper and lower electromagnetic shielding plates 46 for shielding the circuit board 42.

The second housing 40 is a plastic case formed by injection molding a resin material, and it has a structure where an upper half 40a and a lower half 40b, each having the shape of an approximately flat box, are joined and integrated into a single unit with a plurality of screws 47, in a state where the upper and lower halves 40a and 40b are made to face each other at their respective side walls. A space in which the battery 41 and the circuit board 42 are to be accommodated is formed inside this second housing 40, and the shape of the second housing 40 resembles an approximately rectangular plate corresponding to the first housing 8 so as to match the PHD unit 1 mentioned above.

Also, one of the longer sides of the second housing 40 forms a connection plane 40c to be connected to the above-mentioned PHD unit 1. An engagement protrusion 48 to be engaged with the engagement recess 14 of the above-mentioned PHD unit 1 is formed approximately in the center of this connection plane 40c. Also, an opening 49 from which the second connector 43 faces outward is formed on the top surface of this engagement protrusion 48.

Also, on this connection plane 40c, a positioning protrusion 50 serving as a second positioning section is formed to one side of the second connector 43, and a screw member 51 and a protruding section 52, which serve as a second fixing section, are formed to the other side of the second connector 43.

The positioning protrusion 50 is formed at a position where it would be engaged with the above-mentioned positioning hole 16 when the first connector 10 and the second connector 43 are connected.

Figure 10:
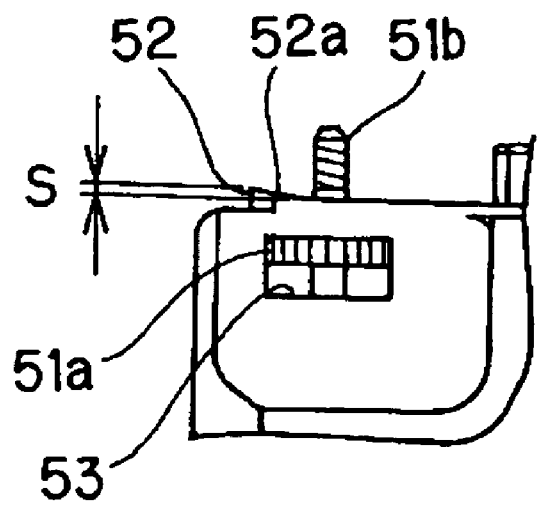
FIG. 10 is a plan view of a main portion of an adaptor showing its attachment structure.

As shown in FIGS. 4 and 10, the screw member 51 has a rotative operation section 51a that is rotationally operated and a screw section 51b that is screwed into the screw hole 17a of the above-mentioned fixing plate 17. The screw member 51 is rotatably accommodated in an internal space in a corner separated from the space in which the circuit board 42 and the battery 41 are accommodated inside the second housing 40. Also, an operation window 53 from which the rotative operation section 51a is exposed is formed on the lower half 40b. Also, the screw section 51b protrudes outward from a hole formed in the connection plane 40c of the second housing 40.

The protruding section 52 has a slanted plane 52a of which one side is taller by a predetermined height s than the other side thereof.

In addition, a second display section 54 for classifying and displaying the interface on the side of the host device 4 by text and color is formed on a principal surface of the upper half 40a. This second display section 54 is devised so as to conceal gate marks generated when the second housing 40 is injection molded. In other words, on the upper half 40a of the second housing 40, a gate mark is generated approximately in a center portion towards the connection plane 40c. However, by forming the second display section 54 at such a position that this gate mark would be covered, the design is improved. In addition, this second display section 54 is formed in a substantially linear manner from where this gate mark is formed towards the end on the side of the connection plane 40c. Also, an LED (Light Emitting Diode) 55 for indicating a condition where the adaptor 2 is connected to the PHD unit 1, the operative condition of the PHD unit 1 and the like is provided on this second display section 54.

The battery 41 is electrically connected to the circuit board 42 and placed inside the second housing 40 so that one overlaps the other. This battery 41 serves as an inner power source and supplies power to the PHD unit 1.

The second connector 43 mounted on the circuit board 42 is a female connector corresponding to the interface on the side of the PHD unit 1 that complies with the signal pin arrangement of the above-mentioned IDE standard. This second connector 43 is attached in a state where it is engaged with the opening 49 of the above-mentioned second housing 40, that is, in a fixed condition. By being connected to the first connector 10 of the PHD unit 1 mentioned above, the second connector 43 is able to supply power to the PHD unit 1, and transmit and receive data to and from the PHD unit 1.

The USB connector 44 mounted on the circuit board 42 is a transmission/reception unit corresponding to the interface on the side of the host device 4 that complies with, for example, the USB standard, and is provided so as to face outward from the side section opposite the connection plane 40c of the second housing 40 mentioned above. By being connected to the host device 4 via the connection cable 5, the USB connector 44 is able to receive power supplied from the host device 4, and to transmit and receive data to and from the host device 4.

In addition, this circuit board 42 includes an interface conversion circuit (IDE/USB conversion circuit) serving as an interface converter for carrying out, between the above-mentioned second connector 43 and USB connector 44, interface conversion between the PHD interface (IDE) and the host device 4 interface (USB). Consequently, power can be supplied from the host device 4 to the PHD unit 1, and the reading and/or writing of data is made possible.

Also, the power source jack 45 mounted on the circuit board 42 is provided such that it faces outward from the side section opposite the connection plane 40c of the second housing 40, and is provided alongside the above-mentioned USB connector 44. By having an AC adaptor connected to the power source jack 45, power can be supplied to the PHD unit 1 from an external power source, and the battery 41 can be charged.

In addition, this circuit board 42 includes a control circuit for controlling the supplying of power to the PHD unit 1 and the charging of the battery 41. Thus, the driving of the PHD unit 1 can be made more stable.

The pair of upper and lower electro-magnetic shielding plates 46 includes approximately rectangular metal plates corresponding to the shape of the circuit board 42. They shield both principal surfaces of the circuit board 42 on which the second connector 43, the USB connector 44 and the power source jack 45 are mounted, and are grounded in relation to the circuit board 42. Also, the pair of upper and lower electro-magnetic shielding plates 46 shields this circuit board 42 in a state where a plurality of bent pieces 56 bent along the circuit board 42 are bent and laid over each other. Thus, electro-magnetic waves radiated from the circuit board 42 can be suitably shielded inside the second housing 40. Also, in the pair of upper and lower electro-magnetic shielding plates 46, by forming a plurality of slits 56a in the bent pieces 56 along the direction in which they are bent, the contact condition between the respective bent pieces 56 is improved, thereby making it possible to further improve the shielding effect for electro-magnetic waves.

The second housing 40 can be made lighter by using a plastic case formed by injection molding a resin material. Moreover, a conductive layer composed of a conductive film or the like may be formed on at least one of the principal surface of each of the upper half 40a and the lower half 40b facing the electro-magnetic shielding plates 46 and the principal surface on the side opposite that principal surface. This makes it possible to further improve the shielding effect for electro-magnetic waves. Alternatively, the second housing 40 may be formed by injection molding a resin material in which a conductive filler is contained. In this case, it is possible to improve the shielding effect for electro-magnetic waves without having to provide an additional component.

The electrical configuration of the adaptor 2 will be described below.

Figure 11:
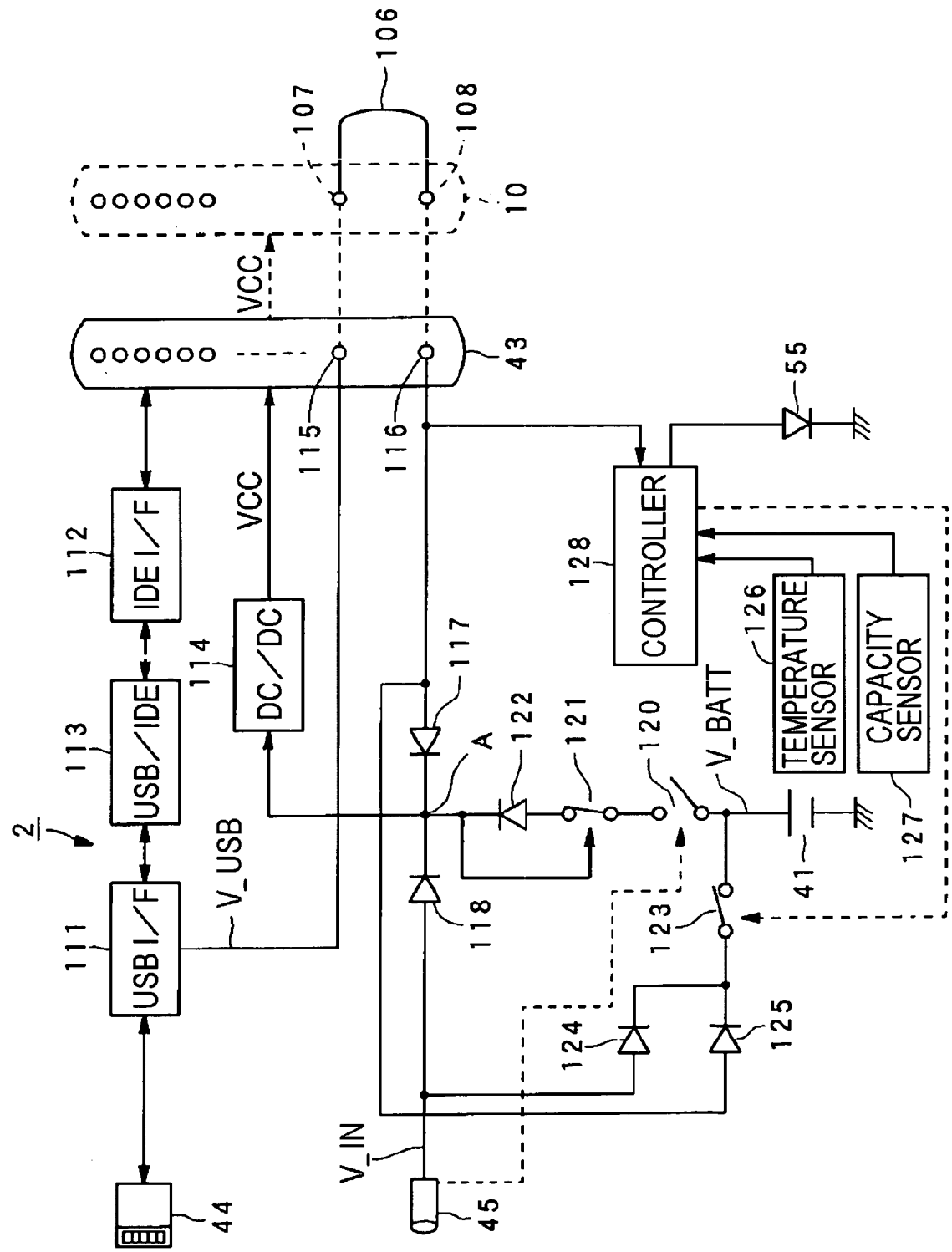
FIG. 11 is an electrical inner configuration view of an adaptor.

As shown in FIG. 11, the adaptor 2 includes a USB interface (I/F) circuit 111, an IDE interface (I/F) circuit 112 and a USB/IDE conversion circuit 113.

The USB interface circuit 111 is an interface circuit for transmitting and receiving data in USB format to and from the host device 4 through the USB connector 44. The IDE interface circuit 112 is the interface circuit for transmitting and receiving data in IDE format to and from the PHD unit 1 through the second connector 43. The USB/IDE conversion circuit 113 is a circuit for carrying out conversion from data of USB format into data of IDE format and vice versa.

In the adaptor 2 having the above-mentioned configuration, the USB interface circuit 111 receives data in USB format transferred from the host device 4 through the USB connector 44. The USB interface circuit 111 transfers the data in USB format received from the host device 4 to the USB/IDE conversion circuit 113. The USB/IDE conversion circuit 113 converts the data in USB format transferred from the USB interface circuit 111 into data in IDE format, and transfers it to the IDE interface circuit 112. The IDE interface circuit 112 transfers the data in IDE format to the PHD unit 1 via the second connector 43. Thus, in the adaptor 2, it is possible to convert data received in USB format from the host device 4 into IDE format data, transfer it to the PHD unit 1, and record the data on the hard disk 24 in the PHD unit 1.

In addition, in the adaptor 2, the IDE interface circuit 112 receives data in IDE format transferred from the PHD unit 1 through the second connector 43. The IDE interface circuit 112 transfers the data in IDE format received from the PHD unit 1 to the USB/IDE conversion circuit 113. The USB/IDE conversion circuit 113 converts the data in IDE format transferred from the IDE interface circuit 112 into data in USB format, and transfers it to the USB interface circuit 111. The USB interface circuit 111 transmits the data in USB format to the host device 4 via the USB connector 44. Thus, in the adaptor 2, it is possible to convert data of IDE format read from the hard disk 24 in the PHD unit 1 into data of USB format, and transmit it to the host device 4.

In addition, the adaptor 2 includes a DC/DC converter 114 for supplying power to the PHD unit 1.

The DC/DC converter 114 is a direct current voltage conversion circuit, such as a so-called switching converter and the like, and is capable of generating a voltage stabilized at a predetermined value regardless of the load. A direct current voltage (VCC) outputted from the DC/DC converter 114 is supplied as direct current power that complies with the IDE standard to the PHD unit 1 through the second connector 43 together with data that is inputted and outputted through the IDE interface circuit 112.

The power supplied to this DC/DC converter 114 is USB power (V_USB) transmitted from the host device 4 through a power line of the USB interface, external power (V_IN) received from an external power source (for example, a converting apparatus for converting AC power into DC power), and battery power (V_BATT) generated by the battery 41 provided inside the adaptor 2. Hereafter, the power input terminal of the DC/DC converter 114 is referred to as input terminal A, and the circuit configuration around the DC/DC converter 114 will be described below.

First and second USB power source pins 115 and 116, which are not required of an IDE interface bus, together with pins matching the transmission line required of an IDE interface are provided in the second connector 43. The first USB power source pin 115 is connected to the USB power line, which is a power line that is USB compliant, via the USB interface circuit 111. The second USB power source pin 116 is connected to the input terminal A of the DC/DC converter 114 through a diode 117. The diode 117 has its cathode connected to the input terminal A, thereby preventing a reverse flow to the USB power line.

The first and second USB power source pins 115 and 116 are connected to the first and second USB power source pins 107 and 108 on the side of the PHD unit 1, respectively, when the adaptor 2 is connected to the PHD unit 1, that is, when the first connector 10 and the second connector 43 are connected. The first and second USB power source pins 107 and 108 on the side of the PHD unit 1 are short-circuited inside the PHD unit 1 with the jumper cable 106. Thus, when the adaptor 2 is connected to the PHD unit 1, the first USB power source pin 115 and the second USB power source pin 116 are electrically connected. Thus, when the adaptor 2 is connected to the PHD unit 1 and the host device 4 and the adaptor 2 are connected through the USB cable 5, USB power (V_USB) is supplied to the DC/DC converter 114.

The power source jack 45 is connected to the input terminal A of the DC/DC converter 114 via a diode 118. The diode 118 has its cathode connected to the input terminal A, thereby preventing counter currents to the external power source. Thus, when the external power source is connected, external power (V_IN) is supplied to the DC/DC converter 114.

The battery 41 has its negative terminal grounded. The battery 41 has its positive terminal connected to the input terminal A of the DC/DC converter 114 via a mode switch 120, a battery switch 121 and a diode 122 which are connected in series. The diode 122 has its cathode connected to the input terminal A. In other words, the mode switch 120 and the battery switch 121 are connected in series between the anode of the diode 122 and the positive terminal of the battery 41. Thus, counter currents to the battery 41 from the input terminal A is prevented.

The mode switch 120 is a switch for switching between on (closed) and off (open) on the basis of an insertion detection signal indicating whether or not an output plug of the external power source is inserted into the power source jack 45. The mode switch 120 becomes off when the output plug of the external power source is inserted into the power source jack 45. The mode switch 120 becomes on when the output plug of the external power source is not inserted into the power source jack 45. The state where the output plug of the external power source is inserted into the power source jack 45 is referred to as recharge mode, state where the output plug of the external power source is not inserted into the power source jack 45 is referred to as discharge mode.

The battery switch 121 switches between on (closed) and off (open) on the basis of the state of the voltage at the input terminal A of the DC/DC converter 114 supplied through the diode 118. The battery switch 121 becomes on when a voltage is applied to the input terminal A (that is, when USB electric power (V_USB) or external electric power (V_IN) is supplied), and it becomes off when a voltage is not applied to the input terminal A.

Thus, in discharge mode, the combined power of USB power (V_USB) and battery power (V_BATT) is supplied to the DC/DC converter 114. Also, in recharge mode, the combined power of external power (V_IN) and USB power (V_USB) is supplied to the DC/DC converter 114. A circuit configuration in which only external power (V_IN) is supplied to the DC/DC converter 114 in recharge mode may also be adopted.

One end of a charging switch 123 is connected to the positive terminal of the battery 41. The other end of the charging switch 123 is connected to the power source jack 45 via a diode 124 and to the second USB power source pin 116 of the second connector 43 via a diode 125. Cathodes of the diodes 124 and 125 are both connected to the charging switch 123, thereby preventing counter currents from the battery 41 to the external power source and the USB power line. The charging switch 123 switches between on (closed) and off (open) on the basis of a control signal. Thus, when the charging switch 123 is on, the battery 41 is charged with USB power (V_USB) and external power (V_IN).

In addition, the adaptor 2 may have a temperature sensor 126, a capacity sensor 127 and a controller 128.

The temperature sensor 126 is a sensor for detecting the temperature of the battery 41. The capacity sensor 127 is a sensor for detecting the capacity of the battery 41.

The controller 128 controls the supplying of power to the USB interface circuit 111, the IDE interface circuit 112, the USB/IDE conversion circuit 113, the DC/DC converter 114 and the like, and controls the charging switch 123, and the like. The second USB power source pin 116 of the second connector 43 is connected to the controller 128. The controller 128 judges the state of the voltage of this second USB power source pin 116 and controls the supplying of power as mentioned above. Also, the controller 128 carries out drive control for the LED 55.

The power supply operation of the adaptor 2 having the above-mentioned configuration, and the various control operations will be described below.

The adaptor 2 is a system that carries out switching control of power supply by way of apparatus connection in such a way that power is not supplied unless the host device 4 and the PHD unit 1 are securely connected. The controller 128 detects the voltage of the second USB power source pin 116 of the second connector 43, and when the voltage is detected, it controls the supplying of power to the USB interface circuit 111, the IDE interface circuit 112, the USB/IDE conversion circuit 113 and the like. Through such control, the adaptor 2 is made a system that does not supply power unless the host device 4 and the PHD unit 1 are connected securely. Thus, in the adaptor 2, for example, even when only an external power source is connected, or a cable which should not have been connected is erroneously connected, there is no risk that unusual power related circumstances would occur. A switch for turning external power (V_IN) from the power source jack 45 on and off may.be provided, and such control where that switch is turned on when the voltage of the second USB power source pin 116 is detected may be performed.

Also, in the adaptor 2, the mode switch 120 is off in recharge mode (the mode in which the plug of the external power source is connected to the power source jack 45), and external power (V_IN) and USB power (V_USB) are supplied to the PHD unit 1. Also, in recharge mode, external power (V_IN) and USB power (V_USB) are supplied to the battery 41, and recharging is carried out. Hence, if an external power source is connected, the battery 41 is charged without the user being consciously aware of it.

In addition, in the adaptor 2, the mode switch 120 is on in discharge mode (the mode in which the plug of the external power source is not connected to the power source jack 45), and the combined power of USB power (V_USB) and battery power (V_BATT) is supplied to the PHD unit 1. Thus, even if a data transfer bus whose power line has a small power capacity is used to carry out transmission/reception with the host device 4, the shortage can be compensated for with the battery power (V_BATT) generated by the battery 41. Thus, even if an external power source is not carried around together, this portable hard disk can be used, thereby improving its portability.

In addition, in discharge mode, USB power (V_USB) is supplied to the battery 41. The adaptor 2 supplies a stable voltage to the PHD unit 1 using the DC/DC converter 114. Thus, if the drive load of the DC/DC converter 114 is substantial (such as when the PHD unit 1 is operated), power is pulled to the DC/DC converter 114 from the battery 41. However, when the drive load of the DC/DC converter 114 is light (such as when the PHD unit 1 is not operating), power is not discharged from the battery 41, and some power of the USB power (V_USB) is left over. Thus, even in discharge mode, the power of the USB electric power (V_USB) that is left over charges the battery 41. Typically, even if an information storage apparatus and a computer are connected, it is not always the case that the information storage apparatus is operating, and often times the information storage apparatus is not operating. Thus, charging can be performed more efficiently by adopting such a circuit configuration where the excess power of the USB electric power (V_USB) is used to charge the battery 41 as mentioned above.

In addition, the adaptor 2 carries out deterioration prevention and safety measures for the battery 41 by controlling the power source in accordance with the temperature of the battery 41. When the temperature of the battery 41 detected by the temperature sensor 126 becomes equal to or greater than a first temperature, the controller 128 turns off the charging switch 123 and terminates charging. Also, when the temperature of the battery 41 becomes equal to or greater than a second temperature (it is preferable that the second temperature be set to a value higher than the first temperature), the operation itself of the adaptor 2 is stopped.

In addition, the adaptor 2 manages the capacity of the battery 41, and prevents the PHD unit 1 from suddenly stopping operating due to the battery 41 running out. When the capacity of the battery 41 detected by the capacity sensor 127 becomes equal to or less than a first threshold, the controller 128 notifies the host device 4 with warning information through the USB interface circuit 111. When notified with warning information, the host device 4, for example, may display on the screen the fact that the battery 41 is running low, or may give an audio notification of the same fact. Also, when the capacity of the battery 41 detected by the capacity sensor 127 becomes equal to or less than a second threshold (the second threshold is a value that is smaller than the first threshold), the controller 128 carries out control to stop the operation of the adaptor 2 altogether. As mentioned above, by preventing the operation from suddenly stopping due to a drop in the capacity of the battery 41, it is possible to prevent data from being corrupted by a sudden stop in operation during the process of writing to or reading from the hard disk.

In addition, the adaptor 2 manages the capacity of the battery 41, and when the battery 41 is fully charged, it turns off the charging switch 123 and stops the charging operation.

In addition, when operation is stopped because the temperature of the battery 41 is at or above the second temperature, because the capacity of the battery 41 is equal to or less than the second threshold value, or due to some other control, the controller 128, for example, watches for a communication flag (a flag generated when data is being transferred) generated by the USB/IDE conversion circuit 113, and carries out an operation stopping process at a point when the host device 4 is not writing nor reading data. The execution of such a process can protect data from being corrupted by having operation stopped during the process of writing to or reading from the hard disk.

In addition, the controller 128 can notify the user of the operative status of the adaptor 2 by carrying out display control of the LED 55. For example, the controller 128 may turn on the LED 55 if the host device 4 and the PHD unit 1 are connected to the adaptor 2. In addition, the controller 128 may, for example, watch for a communication flag (a flag generated when data is being transferred) generated by the USB/IDE conversion circuit 113, and make the LED 55 blink if the host device 4 is writing or reading data. The controller 128, for example, may also make the LED 55 emit different colors depending on whether the mode is the recharge mode or the discharge mode. Moreover, information for identifying whether the battery 41 is being recharged or is fully charged and information for identifying the capacity of the battery 41 may also be displayed.

In the PHD system that is configured in the manner described above and shown in FIG. 1, when the adaptor 2 is connected to the PHD unit 1, the engagement protrusion 48 on the side of the adaptor 2 is engaged with the engagement recess 14 on the side of the PHD unit 1, and the first connector 10 on the side of the PHD unit 1 and the second connector 43 on the side of the adaptor 2 are thus connected. Then, with the positioning protrusion 50 on the side of the adaptor 2 engaged with the positioning hole 16 on the side of the PHD unit 1 and the second housing 40 positioned in relation to the first housing 8, the rotative operation section 51a of the screw member 51 provided, on the side of the adaptor 2 is rotationally operated, the screw section 51b is screwed into the screw hole 17a of the fixing plate 17 provided on the side of the PHD unit 1, and the second housing 40 is fixed to the first housing 8. Thus, a state where the adaptor 2 is attached to the PHD unit 1 is maintained.

The first connector 10 on the side of the PHD unit 1 is attached within the plane of the opening 15 of the first housing 8 in a semi-fixed state with some allowance for movement. On the other hand, the second connector 43 on the side of the adaptor 2 is attached in a fixed state where it is engaged with the opening 49 of the second housing 40. Thus, in this PHD system, it is possible to suitably connect the first connector 10 and the second connector 43 without positioning them precisely, and damage to the connectors upon connecting can be prevented, while the connective reliability of the first connector 10 and the second connector 43 can also be improved.

Figure 12:
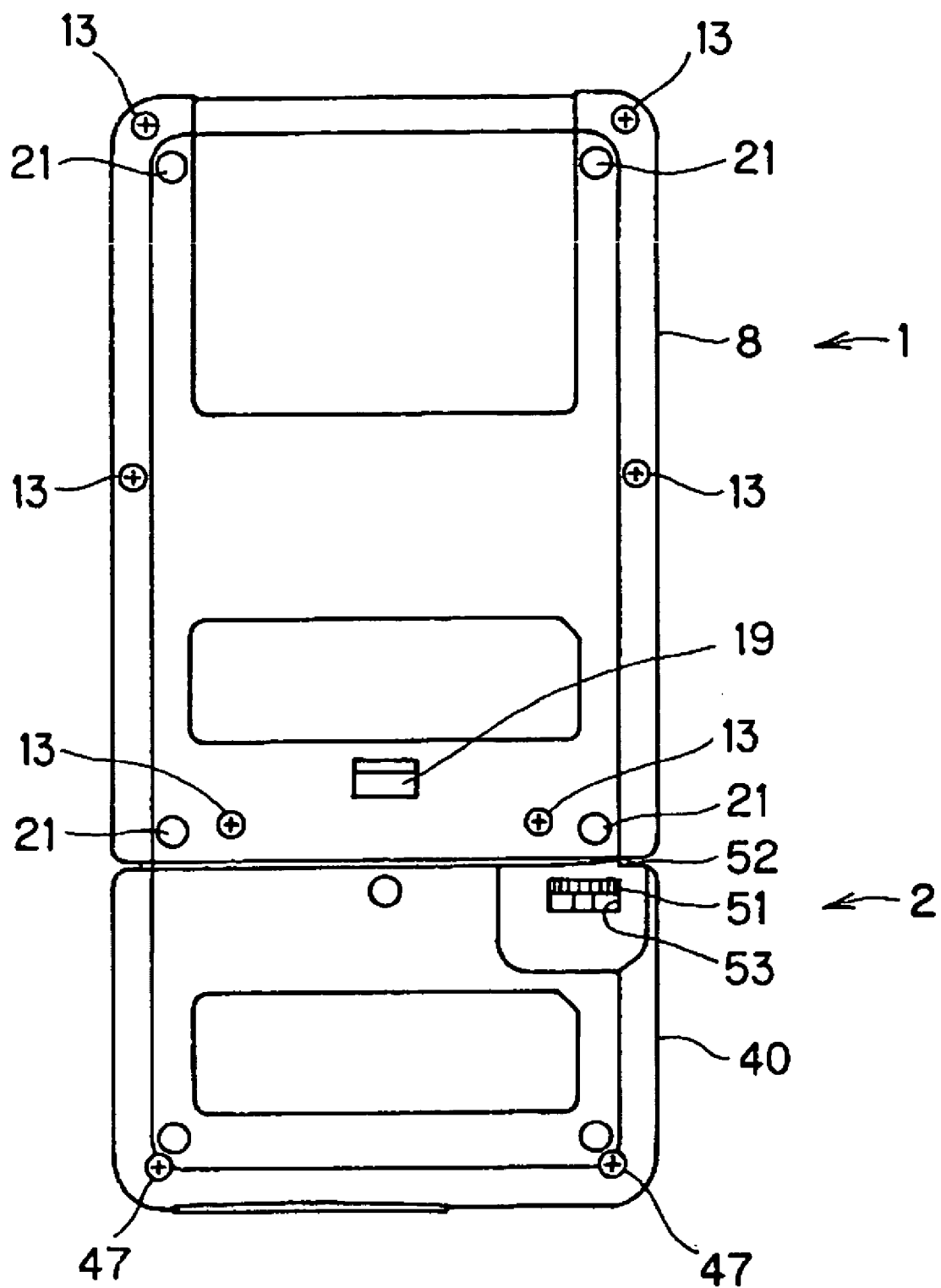
FIG. 12 is a plan view showing a PHD unit and an adaptor as attached.

In addition, in this PHD system, as shown in FIG. 12, the protruding section 52 formed on the connection plane 40c where the second connector 43 of the adaptor 2 faces outward is brought into contact with the connection plane 8c from which the first connector 10 of the PHD unit 1 faces outward. Thus, the second housing 40 is at a slight angle with respect to the first housing 8 such that one side of each of the connection planes 8c and 40c are closer to each other and the other side of each of the connection planes 8c and 40c are spaced further apart from each other. Consequently, even if the housings 8 and 40 are fixed only on one side of the connectors of the connection planes 8c and 40c, it is possible to prevent the positioning protrusion 50 from falling out from the positioning hole 16 formed to the other side of the connectors of the connection planes 8c and 40c, and suitably maintain a state where the first housing 8 and the second housing 40 are fixed.

Thus, in this PHD system, the PHD unit 1 and the adaptor 2 can be integrated into a single unit with a simple structure without adopting a structure in which the connection planes are fixed to each other to both sides of the first connector 10 and the second connector 43. Hence, further miniaturization can be attained.

Also, in this PHD system, as shown in FIG. 1, when the PHD unit 1 and the adaptor 2 are integrated into a single unit, the first display section 18 and the second display section 54 form a continuous and linear displaying section bridging the first housing 8 and the second housing 40, thereby making aesthetically superior display possible. Also, it helps to prevent erroneous connection of the adaptor 2 and the PHD unit 1, thereby improving the ease of use.

This PHD system is electrically connected to, for example, a notebook personal computer 4, which is a host device, via the connection cable 5 in a condition where the adaptor 2 and the PHD unit 1 are connected. Thus, data is written to and read from the host device 4.

In this PHD system, since power can be supplied to the PHD unit 1 from the battery 41 in the adaptor 2, or from an external power source by having the plug of an AC adaptor connected to the power source jack 45, and not just from the host device 4 via the power line of a USB compliant interface, even if the PHD unit 1 includes an HDD 9 of a high capacity, it is possible to stabilize the driving of this PHD unit 1, and to prevent a drop in performance.

The cradle 3, which together with the above-mentioned PHD unit 1 forms part of the PHD system shown in FIG. 2, will be described below.

Figure 13:
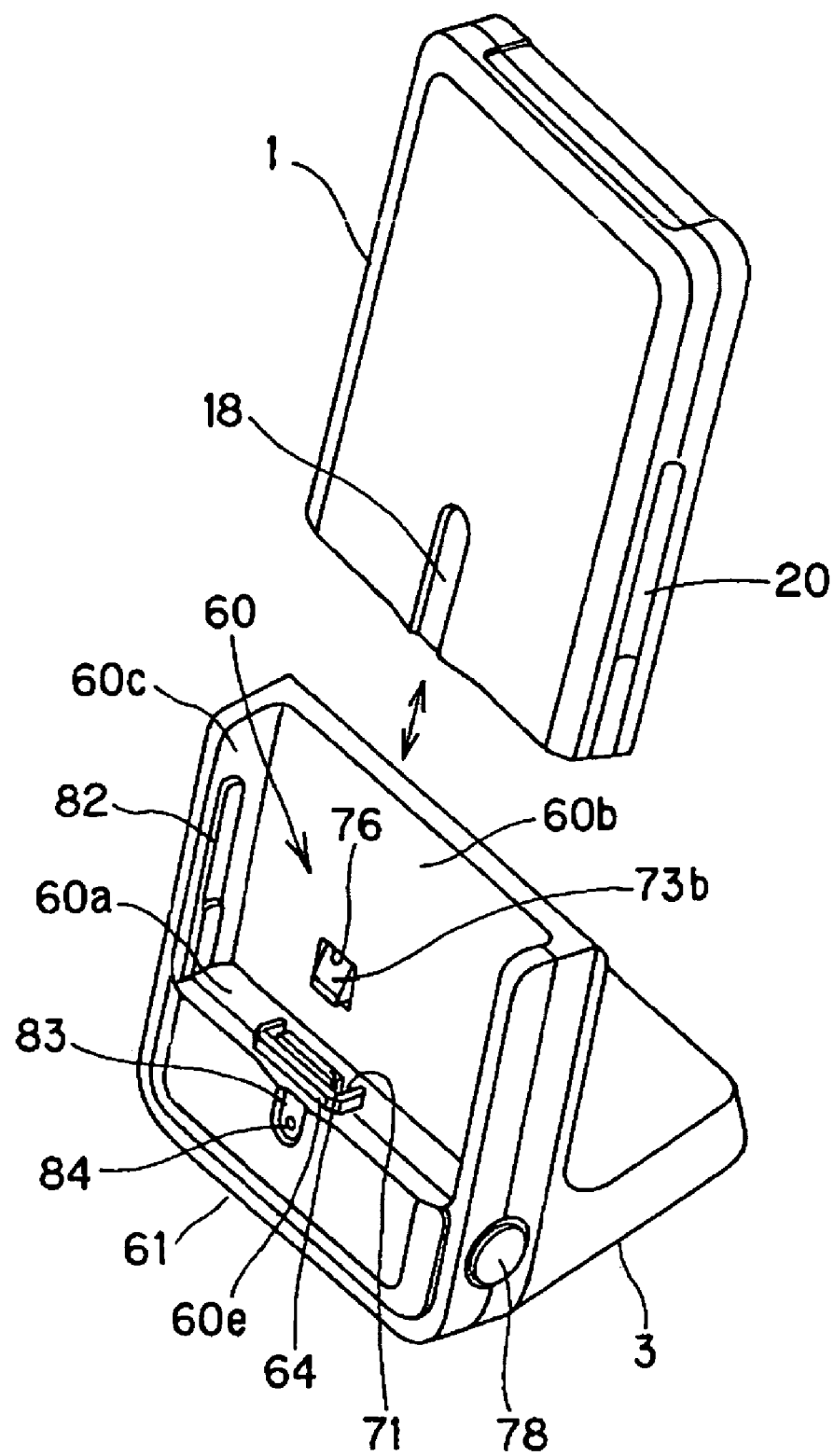
FIG. 13 is a perspective view showing the configuration of a PHD unit and a cradle.
Figure 14:
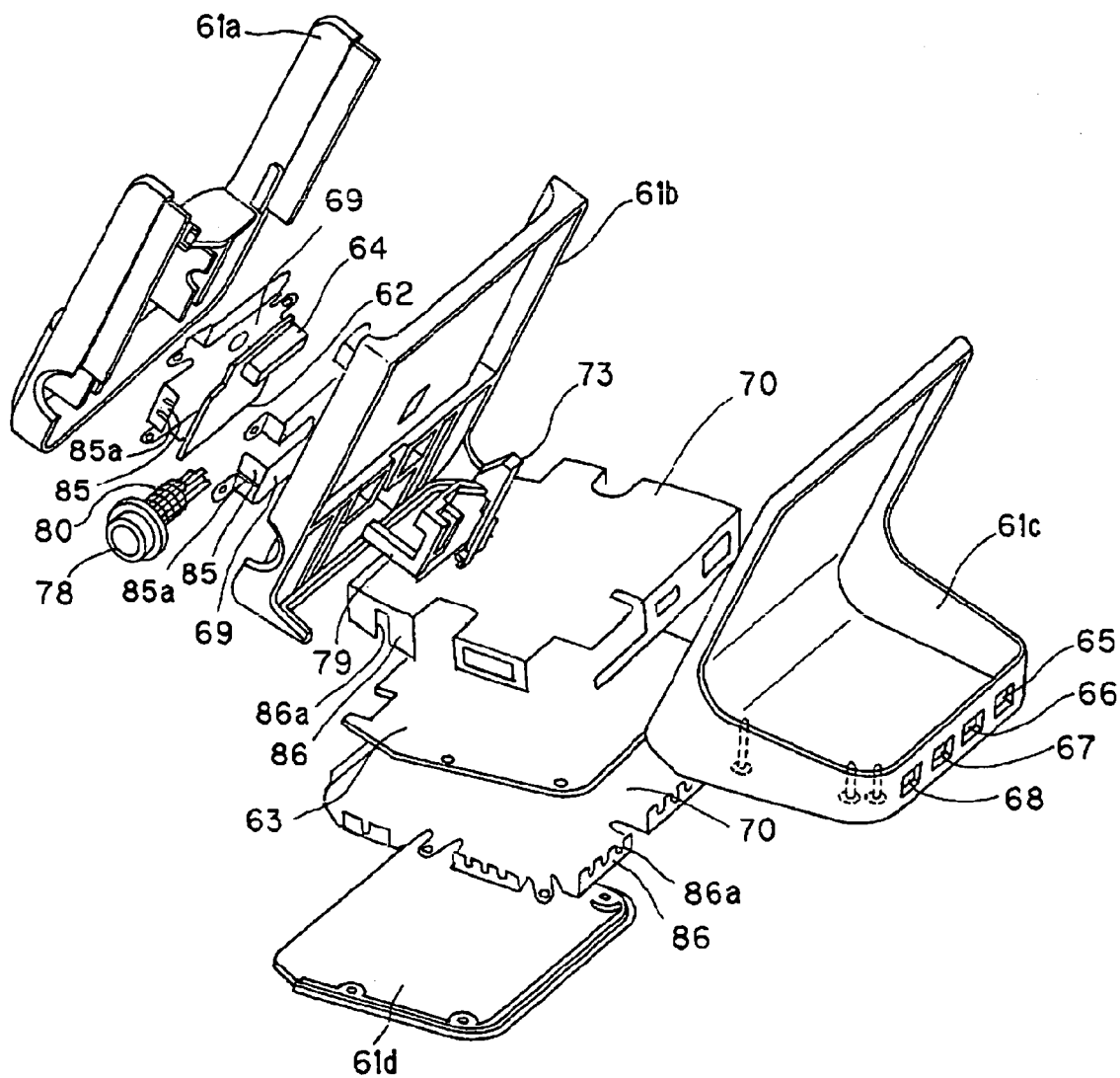
FIG. 14 is an exploded perspective view showing the configuration of a cradle.

As shown in FIGS. 13 and 14, this cradle 3 is provided with: a second housing 61 including a mounting section 60 in which the PHD unit 1 is set; a first circuit board 62 and a second circuit board 63 that are accommodated in the second housing 61; a second connector 64 that is mounted on the first circuit board 62 and faces outward from a bottom plane 60a of the mounting section 60; a first USB connector 65, a second USB connector 66, a third USB connector 67 and a power source jack 68 that are mounted on the second circuit board 63 and face outward from the rear side of second housing 61; a first pair of upper and lower electromagnetic shielding plates 69 for shielding the first circuit board 62; and a second pair of upper and lower electromagnetic shielding plates 70 for shielding the second circuit board 63.

The second housing 61 has a structure where it is divided into a front panel 61a, a center panel 61b, a back panel 61c and a bottom panel 61d. Each of the panels is formed by injection molding a resin material. Then, this second housing 61 is joined and integrated with a plurality of screws (not shown) while they are fitted with one another.

The mounting section 60 is comprised of the front panel 61a and the center panel 61b. A concave section corresponding in shape to the first housing 8 is formed so that the PHD unit 1 fits nicely. An engagement protrusion 60e, which engages with the engagement recess 14 of the PHD unit 1 mentioned above, is formed on the bottom plane 60a of this mounting section 60. Also, an opening 71 from which the second connector 64 faces outward is formed on the inner side of this engagement protrusion 60e, and the second connector 64 is attached such that it is engaged with this opening 71, that is, the second connector 64 is fixed.

Figure 15:
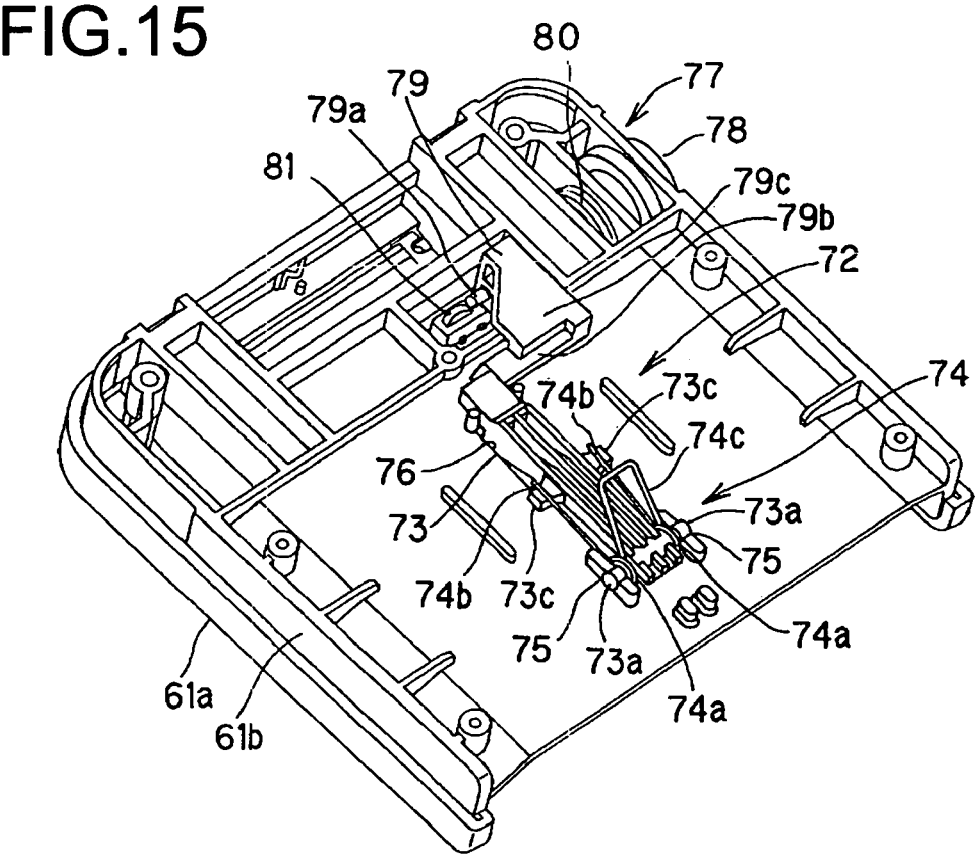
FIG. 15 is a perspective view showing the configuration of a lock mechanism and an unlocking mechanism.

In addition, as shown in FIGS. 14 and 15, a lock mechanism 72 for maintaining a state where the PHD unit 1 is set in this mounting section 60 is formed on the rear side 60b of the mounting section 60 for supporting the rear side of the PHD unit 1.

As shown in FIGS. 13, 14 and 15, this lock mechanism 72 has: an engagement member 73 serving as a second engagement section that engages with the engagement recess section 19 of the PHD unit 1 mentioned above; and a spring member 74 for biasing this engagement member 73 in the direction in which it engages with the engagement recess section 19.

The engagement member 73 is comprised of an elongate member, and has: a pair of shafts 73a, on one end side of the elongate member, pivotally supported by a pair of bearing sections 75 formed on the center panel 61b and the back panel 61c; an engagement protrusion 73b, on the other end side of the elongate member, that is exposed from the rear side 60b of the mounting section 60 through the opening 76 formed in the center panel 61b; and, at the middle section of the elongate member, a pair of spring support pieces 73c onto which the spring member 74 is hooked. By having the pair of shafts 73a pivotally supported by the pair of bearing sections 75, the engagement member 73 is so supported as to be movable between a position where the engagement protrusion 73b is engaged with the engagement recess section 19b of the PHD unit 1 set in the mounting section 60 and a position where the engagement with the engagement recess section 19 of this PHD unit 1 is undone.

The spring member 74 has the pair of shafts 73a of the engagement member 73 inserted into a pair of coiled sections 74a that are formed by having a wire material coiled, and both ends 74b of the wire material that are extended from this pair of coiled sections 74a and are elastically displaceable are hooked onto the pair of spring support pieces 73c of the engagement member 73. This spring member 74 is positioned under a condition where an elastically displaceable middle section 74c, which has a predetermined angle with respect to both ends 74b hooked onto the pair of spring support pieces 73c of the engagement member 73, is in contact with the back panel 61c. Consequently, the spring member 74 biases the engagement member 73 in the direction in which the engagement protrusion 73b is exposed from the rear side 60b of the mounting section 60 through the opening 76 in the center panel 61b.

In addition, with this lock mechanism 72, by having the engagement protrusion 73b of the engagement member 73 engaged with the engagement recess section 19 of the PHD unit 1 when the PHD unit 1 is set in the mounting section 60, it is possible to maintain a state where the PHD unit 1 is set in the mounting section 60, and to prevent the PHD unit 1 from being detached from the mounting section 60 during operation.

In addition, an unlocking mechanism 77 for unlocking the locked state of the PHD unit 1 by the above-mentioned lock mechanism 72 is provided in the second housing 61.

This unlocking mechanism 77 has: an operation button 78 that faces outward from one side section of the second housing 61; an operation member 79 that is operated by pressing this operation button 78; and a compression coil spring 80 for biasing this operation member 79 in a predetermined direction so that the operation button 78 protrudes from the second housing 61. Moreover, the operation member 79 has a switching protrusion 79a for operating a switch 81, which is formed on the first circuit board 62 and serves as switching means for switching the electrical connection between the PHD unit 1 and the host device 6; a sliding operation section 79b that is slid and operated while in engagement with the other end side of the engagement member 73; and an arm section 79c that links the switching protrusion 79a and the sliding operation section 79b.

Figure 16:
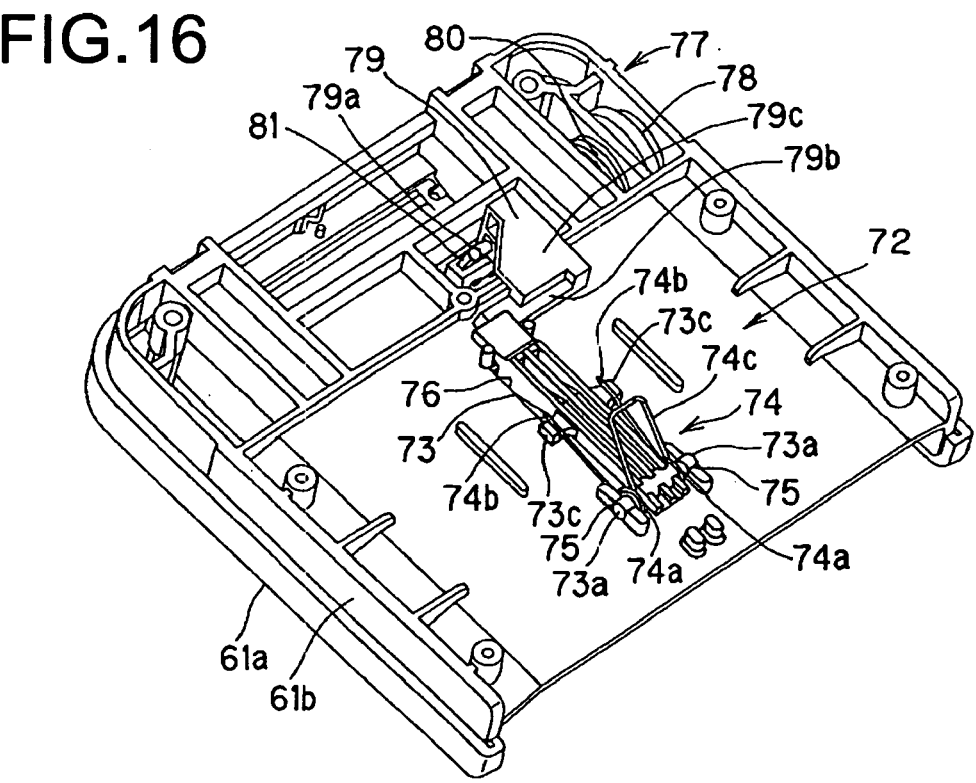
FIG. 16 is a perspective view showing a switch being operated by the unlocking mechanism.
Figure 17:
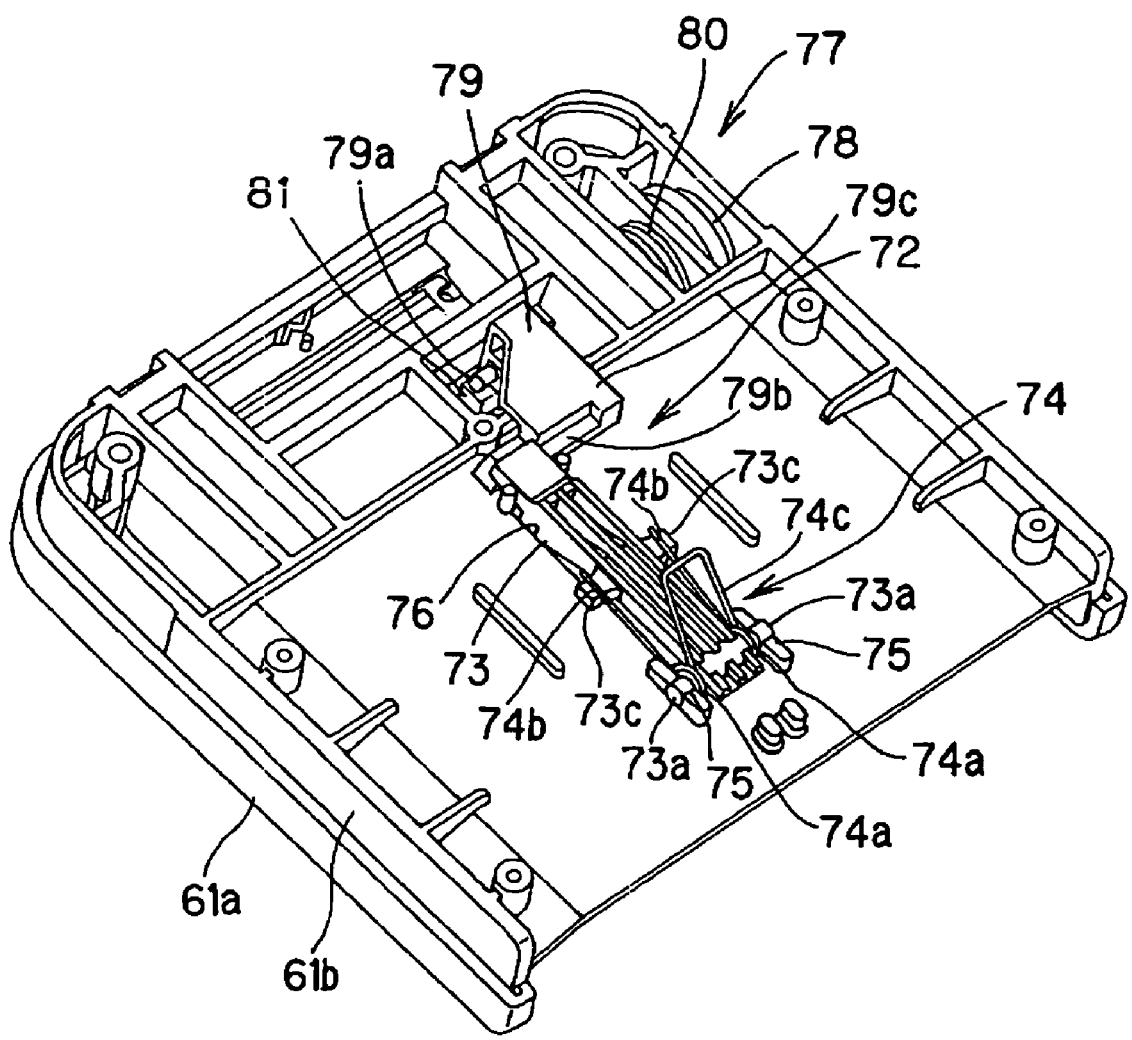
FIG. 17 is a perspective view showing a condition where the lock mechanism has been undone by the unlocking mechanism.

Then, in this unlocking mechanism 77, as shown in FIG. 16, the operation button 78 is pushed against the biasing force of the compression coil 80 so that the switching protrusion 79a of the operation member 79 operates the switch 81, thereby cutting the electrical connection between the PHD unit 1 and the host device 6. Then, as shown in FIG. 17, while the sliding operation section 79b of the operation member 79 is engaged with the other end side of the engagement member 73, the engagement protrusion 73b of the engagement member 73 is moved in a predetermined direction so that the engagement with the engagement recess section 19 of the PHD unit 1 set in the mounting section 60 is undone. Consequently, the locked state of the PHD unit 1 by the lock mechanism 72 mentioned above is undone. In other words, with this unlocking mechanism 77, the electrical connection between the PHD unit 1 and the host device 6 can be cut before the engagement between the engagement protrusion 73b of the engagement member 73 and the engagement recess section 19 of the PHD unit 1 is undone by having the switching protrusion 79a of the operation member 79 operate the switch 81.

As shown in FIG. 13, a pair of guide protrusions 82 serving as second guide sections to be engaged with the pair of guide grooves 20 in the PHD unit 1 mentioned above is formed on both side sections 60c of the mounting section 60. The pair of guide protrusions 82 is formed along both of the side sections 60c from the end on the side of the bottom plane 60a of the mounting section 60.

In addition, a second display section 83 is formed on the principal surface of the front panel 61a. This second display section 83 is devised so as to conceal gate marks generated when the front panel 61a is injection molded. In other words, a gate mark is generated in approximately the center of the front panel 61a. However, by forming the second display section 83 at such a position that this gate mark would be covered, the design is improved. In addition, this second display section 83 is formed in a substantially linear manner from where this gate mark is formed towards the end on the side of the mounting section 60. Also, an LED (Light Emitting Diode) 84 that indicates a state where the PHD unit 1 is mounted on the cradle 3, the operative status of the PHD unit 1 and the like is provided on this second display section 83. Moreover, on the bottom panel 61d, a plurality of rubber pads (not shown) serving as slip stoppers is provided in the corner sections.

The second connector 64 mounted on the first circuit board 62 is a female connector corresponding to the interface on the side of the PHD unit 1 that complies with the signal pin arrangement of the above-mentioned IDE standard. By being connected to the first connector 10 of the PHD unit 1 mentioned above, the second connector 64 is able to supply power to the PHD unit 1, and transmit and receive data to and from the PHD unit 1.

The first USB connector 65 mounted on the second circuit board 63 is a transmission/reception unit corresponding to the interface on the side of the host device 6 that complies with, for example, the USB standard, and it is provided so as to face outward from the rear side of the back panel 61c. By being connected to the host device 6 via the connection cable 7, the first USB connector 65 is able to receive power from the host device 6, and transmit and receive data to and from the host device 6.

In addition, this second circuit board 63 includes an interface conversion circuit (IDE/USB conversion circuit) serving as an interface converter for carrying out, between the above-mentioned second connector 64 and first USB connector 65, interface conversion between the interface on the side of the PHD unit 1 (IDE) and the interface on the side of the host device 6 (USB). Thus, power can be supplied from the host device 6 to the PHD unit 1, and data can be written to and/or read from the PHD unit 1.

In addition, the second USB connector 66 and the third USB connector 67 mounted on the second circuit board 63 are alternate transmission/reception units that comply with, for example, the USB standard, and they are provided so as to face outward from the back panel 61c. By being connected to an electronic device other than the host device 6, the second USB connector 66 or the third USB connector 67 is able to supply power to that electronic device, and transmit and receive data to and from that electronic device.

In addition, the power source jack 68 mounted on the second circuit board 63 is provided such that it faces outward from the rear side of the back panel 61c and is alongside the above-mentioned first USB connector 65. Also, by having the plug of an AC adaptor connected thereto, the power source jack 68 is able to supply power from the external power source to the PHD unit 1.

In addition, this second circuit board 63 includes a control circuit for controlling the supplying of power to the PHD unit 1. Thus, it is possible to stabilize the driving of the PHD unit 1.

The first pair of upper and lower electro-magnetic shielding plates 69 and the second pair of electro-magnetic shielding plates 70 are made of approximately rectangular metal plates corresponding in shape to the first circuit board 62 and the second circuit board 63. They shield both principal surfaces of the first circuit board 62 and the second circuit board 63, and are grounded in relation to the first circuit board 62 and the second circuit board 63. Also, the first pair of upper and lower first electro-magnetic shielding plates 69 and the second pair of upper and lower electro-magnetic shielding plates 70 shield the first circuit board 62 and the second circuit board 63 in a state where a plurality of bent pieces 85 and 86 bent along the first circuit board 62 and the second circuit board 63 overlap each other. Thus, electromagnetic waves radiated from the first circuit board 62 and the second circuit board 63 can be suitably shielded inside the second housing 61. Also, the first pair of upper and lower electro-magnetic shielding plates 69 and the second pair of electro-magnetic shielding plates 70 have a plurality of slits 85*a* and 86*a* formed in the bent pieces 85 and 86 along the direction in which they are bent, thereby improving contact between the bent pieces 85 and 86, and further improving the shielding effect for electro-magnetic waves.

In addition, each of the panels of the second housing 61 can be made lighter by using plastic cases formed by injection molding a resin material. Moreover, a conductive layer comprised of a conductive film or the like may be formed on at least one of the main surface of the panel facing the first electro-magnetic shielding plates 69 or the second electro-magnetic shielding plates 70 and the main surface opposite that main surface. This makes it possible to further improve the shielding effect for electro-magnetic waves. Alternatively, each of the panels of the second housing 61 may be formed by injection molding a resin material in which a conductive filler is contained. In this case, it is possible to improve the shielding effect for electro-magnetic waves without having to provide an additional component.

The electrical configuration of the cradle 3 will be described below.

Figure 18:
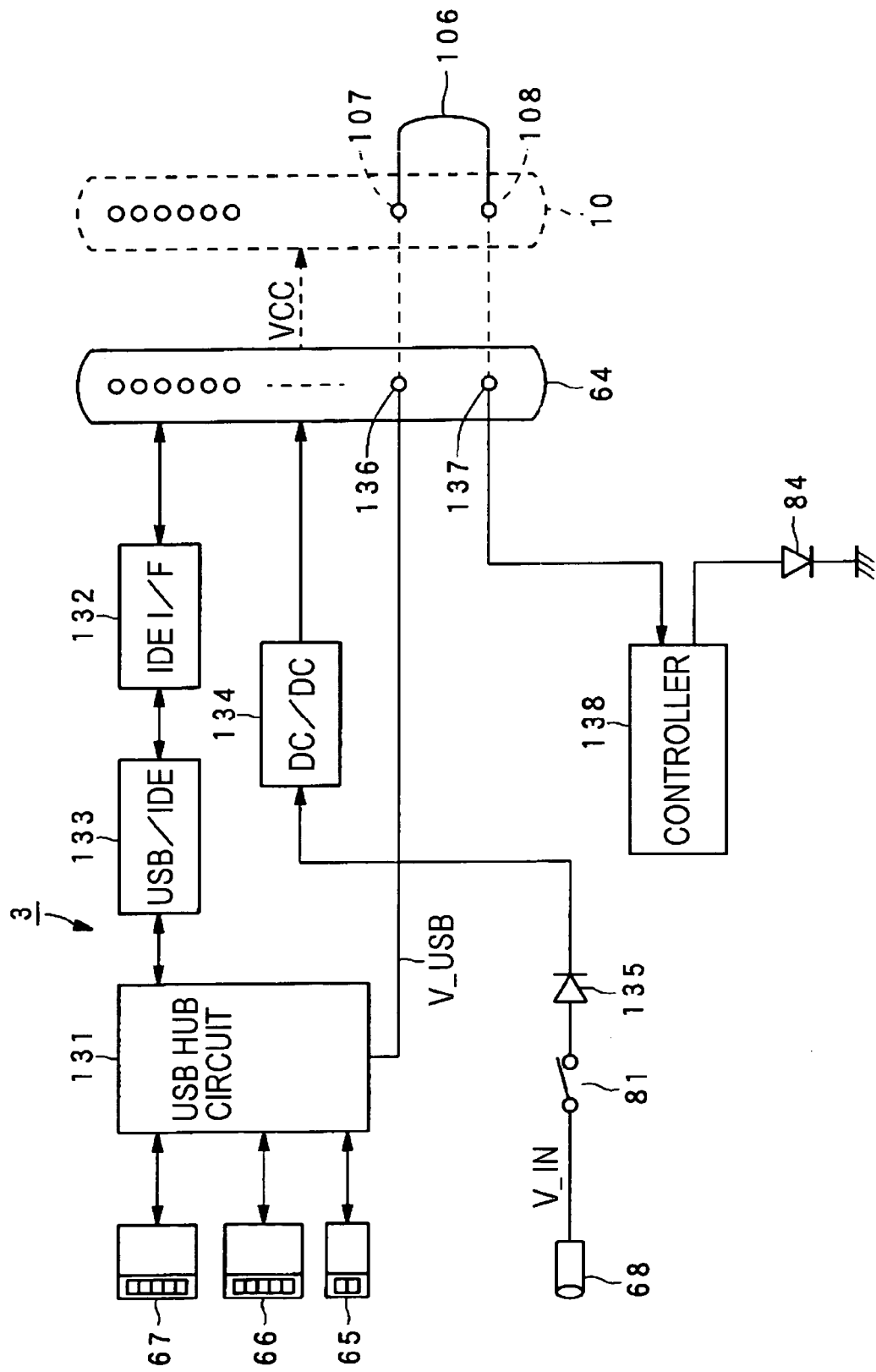
FIG. 18 is an electrical inner configuration view of a cradle.

The cradle 3 includes a USB hub circuit 131, an IDE interface (I/F) circuit 132 and a USB/IDE conversion circuit 133, as shown in FIG. 18.

The USB hub circuit 131 is an interface circuit for transmitting and receiving data in USB format to and from the host device 6 via the first USB connector 65, the second USB connector 66 and the third USB connector 67. The plurality of USB connectors 65 to 67 are connected to the USB hub circuit 131, and any of the connectors may be connected to the host device 6. Also, the USB hub circuit 131 has a so-called hub function. If a device other than the host device 6 is connected to one of the first to third USB connectors 65 to 67, it mediates the transmission and reception of data between the host device 6 and that other device. The IDE interface circuit 132 is an interface circuit for transmitting and receiving data in IDE format to and from tne PHD unit 1 through the second connector 64. The USB/IDE conversion circuit 133 is a circuit for carrying out the conversion of data in USB format into data in IDE format and vice versa.

In the cradle 3 having such a configuration, the USB hub circuit 131 receives data in USB format transferred through any of the first to third USB connectors 65 to 67 from the host device 6. The USB hub circuit 131 transfers the data in USB format received from the host device 6 to the USB/IDE conversion circuit 133. The USB/IDE conversion circuit 133 converts the data in USB format transferred from the USB hub circuit 131 into IDE format data, and transfers it to the IDE interface circuit 132. The IDE interface circuit 132 transfers the data in IDE format to the PHD unit 1 through the second connector 64. Thus, with the cradle 3, data received in USB format from the host device 6 can be converted into IDE format data and transferred to the PHD unit 1. Then, that data can be recorded on the hard disk 24 in the PHD unit 1.

In addition, in the cradle 3, the IDE interface circuit 132 receives data in IDE format transferred from the PHD unit 1 through the second connector 64. The IDE interface circuit 132 transfers the data in IDE format received from the PHD unit 1 to the USB/IDE conversion circuit 133. The USB/IDE conversion circuit 133 converts the data in IDE format transferred from the IDE interface circuit 132 into data in USB format, and transfers it to the USB hub circuit 131. The USB hub circuit 131 transmits the data in USB format to the host device 6 through any of the first to third USB connectors 65 to 67. Thus, with the cradle 3, data in IDE format read from the hard disk 24 in the PHD unit 1 can be converted into USB format data and transmitted to the host device 6.

In addition, the cradle 3 includes a DC/DC converter 134 for supplying power to the PHD unit 1.

The DC/DC converter 134 is a direct current voltage conversion circuit, such as a so-called switching converter and the like, and can generate a voltage stabilized at a predetermined value regardless of the load. The direct current voltage (VCC) outputted from the DC/DC converter 134 is supplied, as direct current power that is IDE compliant, to the PHD unit 1 through the second connector 64 along with data that is inputted and outputted through the IDE interface circuit 132.

The power supplied to this DC/DC converter 134 is external power (V_IN) inputted from an external power source (for example, a conversion apparatus for converting AC power into DC power). The power source jack 68 is connected to an input terminal of the DC/DC converter 134 through a switch 81 and a diode 135. The diode 135 has its cathode connected to the input terminal of the DC/DC converter 134, thereby preventing counter currents to the external power source. Thus, when an external power source is connected, external power (V_IN) is supplied to the DC/DC converter 134.

In addition, the switch 81 is a switch that is turned on and off in conjunction with the unlocking mechanism 77 and cuts the supplying of power to the PHD unit 1. The switch 81 is turned on (closed) when the PHD unit 1 is connected to the cradle 3. However, it is turned off (opened) when the user presses the operation button 78 and removes the PHD unit 1 from the cradle 3. Moreover, this switch 81 has a mechanism where it is turned off before the first connector 10 and the second connector 64 are disconnected. Thus, by virtue of this switch, the supplying of power to the PHD unit 1 is always stopped before the PHD unit 1 is removed from the cradle 3.

Along with pins corresponding to the transmission line required of an IDE interface, the second connector 64 is provided with first and second USB power source pins 136 and 137 not required of an IDE interface bus. The first USB power source pin 136 is connected to a USB power line, which is a power line defined in the USB standard, via the USB hub circuit 131. The second USB power source pin 137 is connected to a controller 138.

The first and second USB power source pins 136 and 137 are connected to the first and second USB power source pins 107 and 108 on the side of the PHD unit 1, respectively, when the PHD unit i is mounted on the cradle 3, that is, when the first connector 10 and the second connector 64 are connected. The first and second USB power source pins 107 and 108 on the side of the PHD unit 1 are short-circuited by the jumper cable 106 inside the PHD unit 1. Thus, when the PHD unit 1 is mounted on the cradle 3, the first USB power source pin 136 and the second USB power source pin 137 are electrically connected. Thus, USB power (V_USB) is supplied to the DC/DC converter 134 when the PHD unit 1 is mounted on the cradle 3 and the host device 6 and the cradle 3 are connected through the USB cable 7.

The controller 138 controls the supplying of power to the USB hub circuit 131, the IDE interface circuit 132, the USB/IDE conversion circuit 133, the DC/DC converter 134 and the like. Also, the second USB power source pin 137 of the second connector 64 is connected to the controller 138. The controller 138 judges the state of the voltage of this second USB power source pin 137, and carries out the above-mentioned control of power supply. Also, the controller 138 carries out drive control for the LED 84.

The power supply operation of the cradle 3 having the above-mentioned configuration, and the various control operations will be described below.

The cradle 3 is a system in which switching control of power supply is performed in accordance with apparatus connection where power is not supplied unless the host device 6 and the PHD unit 1 are securely connected. The controller 138 detects the voltage of the second USB power source pin 137 of the second connector 64. When a voltage is detected, the controller 138 carries out power supply control to the USB hub circuit 131, the IDE interface circuit 132, the USB/IDE conversion circuit 133 and the like. By carrying out such control, the cradle 3 becomes a system that does not supply power unless the host device 6 and the PHD unit 1 are securely connected. Thus, with the cradle 3, for example, even if only an external power source is connected, or even if a cable which should not have been connected is erroneously connected, there is no risk that unusual power related circumstances would occur. A switch for turning external power (V_IN) from the power source jack 68 on and off may be provided, and such control where that switch is turned on when the voltage of the second USB power source pin 137 is detected may be performed.

The controller 138 can notify the user of the operative status of the cradle 3 by carrying out display control of the LED 84. For example, the controller 138 may turn on the LED 84 if the host device 6 and the PHD unit 1 are connected to the cradle 3. In addition, the controller 138 may, for example, watch for a communication flag (a flag generated when data is being transferred) generated by the USB/IDE conversion circuit 133, and make the LED 84 blink if the host device 6 is writing or reading data.

In the PHD system that is configured as mentioned above and shown in FIG. 2, when the PHD unit 1 is mounted on the mounting section 60 of the cradle 3, first, the guide grooves 20 on the side of the PHD unit 1 and the guide protrusions 82 on the side of the mounting section 60 are engaged with each other, and the PHD unit 1 is thus guided while being mounted on the mounting section 60 of the cradle 3. Then, if the PHD unit 1 is mounted on the mounting section 60 of the cradle 3, the engagement protrusion 60e on the side of the mounting section 60 is engaged with the engagement recess 14 on the side of the PHD unit 1, and the first connector 10 on the side of the PHD unit 1 and the second connector 64 on the side of the adaptor 2 are connected. Also, by having the engagement protrusion 73b of the engagement member 73 engaged with the engagement recess section 19 on the side of the PHD unit 1, a state where the PHD unit 1 is set in the mounting section 60 is suitably maintained.

The first connector 10 on the side of the PHD unit 1 is attached within the plane of the opening 15 of the first housing 8 in a semi-fixed state with some allowance for movement. On the other hand, the second connector 64 on the side of the mounting section 60 is attached in a fixed state where it is engaged with the opening 71 of the second housing 61. Thus, in this PHD system, it is possible to suitably connect the first connector 10 and the second connector 64 without having to position them precisely, and damage to the connectors upon connecting can be prevented, while the connective reliability of the first connector 10 and the second connector 64 can also be improved.

In addition, in this PHD system, as shown in FIG. 2, when the PHD unit 1 is mounted on the mounting section 60 of the cradle 3, the first display section 18 and the second display section 83 form a continuous and linear displaying section bridging the first housing 8 and the second housing 61, thereby making aesthetically superior display possible. Also, it helps to prevent erroneous connection when the PHD unit 1 is mounted on the mounting section 60 of the cradle 3, thereby improving the ease of use.

This PHD system is electrically connected to, for example, a desktop personal computer 6, which is a host device, via the connection cable 7 in a condition where the PHD unit 1 is mounted on the mounting section 60 of the cradle 3. Thus, data is written to and read from the host device 6.

In this PHD system, since power can be supplied to the PHD unit 1 from an external power source by having the plug of an AC adaptor connected to the power source jack 68, and not just from the host device 6 via the power line of a USB compliant interface, even if the PHD unit 1 includes an HDD 9 of a high capacity, it is possible to stabilize the driving of this PHD unit 1, and prevent a drop in performance.

In addition, in this PHD system, by pressing the operation button 78 of the unlocking mechanism 77 in removing the PHD unit 1 from the mounting section 60 of the cradle 3, the switching protrusion 79a of the operation member 79 operates the switch 81 on the first circuit board 62 and cuts the electrical connection between the PHD unit 1 and the host device 6 before the engagement between the engagement protrusion 73b of the engagement member 73 and the engagement recess section 19 of the PHD unit 1 is undone. Thus, it is possible to protect the PHD unit 1.

As mentioned above, in the PHD systems shown in FIGS. 1 and 2, the combination of the PHD unit 1 and the adaptor 2 or the cradle 3 can be altered easily depending on the usage. Also, in this PHD system, the PHD unit 1 can be easily replaced with respect to the adaptor 2 or the cradle 3, and this PHD unit 1 itself can be carried freely. Also, this PHD unit 1 may be miniaturized so that it can be handled with ease as a portable recording medium.

Although in the above-mentioned PHD system, a configuration is adopted where the first connector 10 on the side of the PHD unit 1 is semi-fixed, and the second connectors 43 and 64 on the side of the adaptor 2 and the cradle 3 are fixed, it is also possible to adopt a configuration where the first connector 10 on the side of the PHD unit 1 is fixed, and the second connectors 43 and 64 on the side of the adaptor 2 and the cradle 3 are semi-fixed.

In other words, the first connector 10 may be fixed in place by being engaged with the opening 15 of the first housing 8 as mentioned above. On the other hand, the second connectors 43 and 63 may be semi-fixed in the planes of the openings 49 and 71, respectively, by being engaged with the openings 49 and 71 of the second housings 40 and 61 with some allowance for movement as mentioned above.

Thus, in the PHD system, it is possible to suitably connect the first connector 10 and the second connectors 43 and 64 without positioning them precisely, and prevent damage to the connectors upon connection, while at the same time improving the connective reliability between the first connector 10 and the second connectors 43 and 64.

In the present invention, the interface between the adaptor 2 and the cradle 3 and the host devices 4 and 6 is not limited to a USB compliant interface, and it is possible to adopt an interface that complies with IEEE (Institute of Electrical and Electronics Engineers) 1394, ATA/ATAPI (Advanced Technology Attachment/Packet Interface), SCSI (Small Computer System Interface), PC Card and the like. Also, in the present invention, the interface between the adaptor 2 and the cradle 3 and the host devices 4 and 6 is not limited to a wired interface using a connection cable, and may be one that is connected through a transmission/reception unit that complies with IEEE 802.11b (wireless LAN), Bluetooth (short range wireless communications) and the like.

Since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A hard disk system, comprising:
    a hard disk unit, including:
        a recording/reading section, including;
            a hard disk;
            a rotation section that rotates said hard disk;
            a magnetic head for performing recording/reading of data with respect to said hard disk rotated by said rotation section; and
            a head actuator that actuates said magnetic head in the radial direction of said hard disk;
        a first connector electrically connected with said recording/reading section;
        a first housing in which said recording/reading section is housed and from which said first connector faces outward;
        a first display section provided on said first housing; and
        a first engagement section provided on said first housing; and
    a conversion unit, including:
        a second housing that is provided with a mounting section on which said hard disk unit is mounted externally to said second housing;
        a second connector facing outward from said mounting section of said second housing;
        a transmission/reception section for transmitting and receiving data to and from a host device that performs writing and/or reading of data with respect to said hard disk unit;
        an interface conversion unit for performing, between said second connector and said transmission/reception section, interface conversion between an interface on the side of said hard disk unit and an interface on the side of said host device;
        a second engagement section provided so as to be movable between a position at which said second engagement section is engaged with said first engagement section and a position at which engagement with said first engagement section is undone;
        a biasing member that biases said second engagement section in a direction in which said second engagement section engages with said first engagement section; and
        a second display section provided on said second housing, wherein,
        said first engagement section and said second engagement section are engaged and said first connector and said second connector are connected when said hard disk unit is in a mounted state where it is mounted on said mounting section of said conversion unit, and data is transmitted and received between said transmission/reception section and said host device, and
        when said first connector and said second connector are connected and said hard disk unit is connected to said conversion unit, said first display section and said second display section form a continuous display section bridging said first housing and said second housing.

2. The hard disk system according to claim 1, wherein said mounted state is maintained by having said first and second engagement sections mutually engaged.

3. The hard disk system according to claim 1, wherein said hard disk unit further comprises at least one cushioning member between said first housing and said recording/reading section.

4. The hard disk system according to claim 1, wherein said conversion unit further comprises a battery that supplies power to said hard disk unit.

5. The hard disk system according to claim 1, wherein said conversion unit is one of a cradle on which said hard disk unit is mounted and an adaptor that is connected to said hard disk unit.

6. The hard disk system according to claim 5, wherein said conversion unit further comprises an other transmission/reception section for transmitting and receiving data to and from an other electronic device other than said host device.

7. The hard disk system according to claim 1, wherein said conversion unit further comprises an operation section that operates said second engagement section so as to move against the bias of said biasing member in a direction for undoing the engagement with said first engagement section.

8. The hard disk system according to claim 1, wherein
    said conversion unit further comprises a disconnecting section that cuts an electrical connection between said hard disk unit and said host device, and
    said operation section operates said disconnecting section to cut said electrical connection between said hard disk unit and said host device before the engagement between said first engagement section and said second engagement section is undone.

9. The hard disk system according to claim 1, wherein
    said hard disk unit further comprises a first external guide section provided on said first housing,
    said conversion unit further comprises a second guide section provided on said second housing, and
    while said first guide section and said second guide section are engaged, said hard disk unit is guided so as to be mounted on said mounting section of said conversion unit.

10. The hard disk system according to claim 1, wherein one of said first housing and said second housing further comprises a protruding section, and said protruding section includes a slanted surface of which one side is taller than the other.

11. The hard disk system according to claim 1, wherein said second display section includes an indicator that indicates a state where said hard disk unit is connected to said conversion unit.

12. The hard disk system according to claim 1, wherein said conversion unit further comprises:
- a circuit board on which said interface conversion unit is provided; and
- an electromagnetic shielding plate for shielding said circuit board, and said second housing houses said circuit board.

13. The hard disk system according to claim 1, wherein one of said first connector and said second connector is loosely fit in an opening formed in a surface facing outward from one of said first housing and said second housing, respectively.

14. A hard disk unit that is attachable to and detachable from a conversion unit for performing interface conversion between said hard disk unit and a host device that performs writing and/or reading of data, said hard disk unit comprising:
- a recording/reading section, including:
  - a hard disk;
  - a rotation section that rotates said hard disk;
  - a magnetic head for performing recording/reading of data with respect to said hard disk rotated by said rotation section; and
  - a head actuator that actuates said magnetic head in the radial direction of said hard disk;
- a first connector that is electrically connected to said recording/reading section;
- a first housing in which is housed said recording/reading section and from which said first connector faces outward;
- a first display section provided on said first housing; and
- a first engagement section provided on said first housing, wherein,
said conversion unit includes:
- a second housing on which is provided a mounting section on which said hard disk unit is mounted externally to said second housing;
- a second connector that faces outward from said mounting section of said second housing;
- a second display section provided on said second housing;
- a transmission/reception section for transmitting and receiving data to and from said host device;
- interface conversion unit for performing, between said second connector and said transmission/reception section, interface conversion between an interface on the side of said hard disk unit and an interface on the side of said host device;
- a second engagement section provided so as to be movable between a position at which said second engagement section is engaged with said first engagement section and a position at which the engagement with said first engagement section is undone; and
- a biasing member that biases said second engagement section in a direction in which said second engagement section engages with said first engagement section, said first engagement section is engaged with said second engagement section and said first connector is connected to said second connector when said hard disk unit is in a mounted state where it is mounted on said mounting section of said conversion unit, and data is transmitted and received between said transmission/reception section and said host device, and when said first connector and said second connector are connected and said hard disk unit is connected to said conversion unit, said first display section and said second display section form a continuous display section bridging said first housing and said second housing.

15. The hard disk unit according to claim 14, further comprising a first guide section provided on said first housing, wherein
said conversion unit includes a second guide section provided on said second housing, and
while said first guide section and said second guide section are engaged, said hard disk unit is guided so as to be mounted on said mounting section of said conversion unit.

16. The hard disk unit according to claim 14, wherein said mounted state is maintained by having said first and second engagement sections mutually engaged.

17. The hard disk unit according to claim 14, further comprising at least one cushioning member between said first housing and said recording/reading section.

18. The hard disk unit according to claim 14, wherein said first connector is loosely supported in a plane of said first housing facing outward.

19. The hard disk unit according to claim 14, wherein said first housing further comprises a protruding section, and said protruding section includes a slanted surface of which one side is taller than the other.

20. A conversion unit that is attachable to and detachable from a hard disk unit with respect to which writing and/or reading of data from a host device is performed, wherein
said hard disk unit comprises:
- a recording/reading section, including:
  - a hard disk;
  - a rotation section that rotates said hard disk;
  - a magnetic head for performing recording/reading of data with respect to said hard disk rotated by said rotation section; and
  - a head actuator that actuates said magnetic head in the radial direction of said hard disk;
- a first connector electrically connected to said recording/reading section;
- a first housing in which said recording/reading section is housed and from which said first connector faces outward;
- a first display section provided on said first housing; and
- a first engagement section provided on said first housing, said conversion unit comprises:
- a second housing provided with a mounting section on which said hard disk unit is mounted externally to said second housing;
- a second connector that faces outward from said mounting section of said second housing;
- a second display section provided on said second housing;
- a transmission/reception section for transmitting/receiving data to and from said host device that performs writing and/or reading of data with respect to said hard disk unit;
- an interface conversion unit for performing, between said second connector and said transmission/reception section, interface conversion between an interface on the side of said hard disk unit and an interface on the side of said host device;
- a second engagement section provided so as to be movable between a position at which said second engagement section is engaged with said first engagement section and a position at which the engagement with said first engagement section is undone; and a biasing member that biases said second engagement section in a direction in which said second engagement section engages with said first engagement section, and when said hard disk unit is mounted on said mounting section, said second engagement section engages with said first engagement section and said second connector is connected to said first connector, and data is transmitted/received between said transmission/reception section and said host device, and when said first connector and said second connector are connected and said hard disk unit is connected to said conversion unit, said first display section and said second display section form a continuous display section bridging said first housing and said second housing.

21. The conversion unit according to claim 20, further comprising an operation section that operates said second engagement section so as to move against the bias of said biasing member in a direction in which the engagement with said first engagement section is undone.

22. The conversion unit according to claim 20, further comprising a cutting section for cutting an electrical connection between said hard disk unit and said host device, wherein said operation section operates said cutting section to cut the electrical connection between said hard disk unit and said host device before the engagement between said first engagement section and said second engagement section is undone.

23. The conversion unit according to claim 20, further comprising a second guide section provided on said second housing, wherein said hard disk unit further comprises a first guide section provided on said first housing, and said hard disk unit is guided so as to be mounted on said mounting section while said second guide section is engaged with said first guide section.

24. The conversion unit according to claim 20, a state where said conversion unit is connected to said hard disk unit is maintained by having said first engagement section and said second engagement section engaged with each other.

25. The conversion unit according to claim 20, further comprising a battery for supplying power to said hard disk unit.

26. The conversion unit according to claim 20, further comprising an other transmission/reception section for transmitting/receiving data to and from an electronic device other than said host device.

27. The conversion unit according to claim 20, wherein said conversion unit is one of a cradle on which said hard disk unit is mounted and an adaptor which is connected to said hard disk unit.

28. The conversion unit according to claim 20, wherein said second display section includes an indicator that indicates a state where said conversion unit is connected to said hard disk unit.

29. The conversion unit according to claim 20, further comprising:

a circuit board on which said interface conversion unit is provided; and an electromagnetic shielding plate for shielding said circuit board, wherein, said circuit board is housed in said second housing.

30. The conversion unit according to claim 20, wherein said second connector is loosely supported in a plane of said second housing facing outward.

31. The conversion unit according to claim 20, wherein said second housing further comprises a protruding section, and said protruding section includes a slanted surface of which one side is taller than the other.

* * * * *